United States Patent
Webb et al.

(10) Patent No.: US 6,983,645 B2
(45) Date of Patent: Jan. 10, 2006

(54) METHOD FOR ACCELERATED AGING OF CATALYTIC CONVERTERS INCORPORATING ENGINE COLD START SIMULATION

(75) Inventors: Cynthia C. Webb, San Antonio, TX (US); Bruce B. Bykowski, San Antonio, TX (US); Gordon J. Bartley, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 200 days.

(21) Appl. No.: 10/439,146

(22) Filed: May 15, 2003

(65) Prior Publication Data
US 2004/0025580 A1  Feb. 12, 2004

Related U.S. Application Data

(63) Continuation-in-part of application No. 10/213,890, filed on Aug. 6, 2002.

(51) Int. Cl.
G01M 15/00 (2006.01)

(52) U.S. Cl. ..................................................... 73/118.1
(58) Field of Classification Search ................ 73/23.31, 73/23.32, 116, 117.2, 117.3, 118.1, 119 R
See application file for complete search history.

(56) References Cited

U.S. PATENT DOCUMENTS

| | | |
|---|---|---|
| 1,102,510 A | 7/1914 | Irish |
| 3,030,773 A | 4/1962 | Johnson |
| 3,131,749 A | 5/1964 | Davis |
| 3,176,751 A | 4/1965 | Gerlitz |
| 3,503,715 A | 3/1970 | Haensel |
| 3,630,024 A | 12/1971 | Hopkins |

(Continued)

FOREIGN PATENT DOCUMENTS

| | | |
|---|---|---|
| EP | 000895024 A2 | 2/1999 |
| EP | 000961013 A2 | 12/1999 |
| GB | 2329853 | 7/1999 |
| GB | 2356826 | 6/2001 |
| JP | 51-111927 | 10/1976 |
| JP | 56-49820 | 5/1981 |
| JP | 04-72410 | 3/1992 |
| JP | 07-198127 | 8/1995 |
| JP | 11-159386 | 6/1999 |
| JP | 11-270808 | 10/1999 |
| WO | WO 03 014620 | 2/2003 |

OTHER PUBLICATIONS

Proceedings of the Eight CRC On–Road Vehicle Emissions Workshop, vol. 2, Apr. 20–22, 1998 ("CRC Proceedings").

SAE Presents Automotive Systems Testing Toptec, Oct. 14–15, 1998, Novi, Michigan ("SAE Presentation").

(Continued)

Primary Examiner—Eric S. McCall
(74) Attorney, Agent, or Firm—Baker Botts L.L.P.

(57) ABSTRACT

A method for accelerated aging of an automotive catalytic converter under conditions incorporating cold start simulation.

139 Claims, 9 Drawing Sheets

U.S. PATENT DOCUMENTS

| | | | |
|---|---|---|---|
| 3,685,740 A | 8/1972 | Sheperd | |
| 3,694,135 A | 9/1972 | Dancy | |
| 3,818,846 A | 6/1974 | Reese | |
| 4,035,137 A | 7/1977 | Arand | |
| 4,054,418 A | 10/1977 | Miller et al. | |
| 4,118,171 A | 10/1978 | Flanagan et al. | |
| 4,270,896 A | 6/1981 | Polinski et al. | |
| 4,383,411 A | 5/1983 | Riddel | |
| 4,651,524 A | 3/1987 | Brighton | |
| 4,845,940 A | 7/1989 | Beer | |
| 4,878,380 A | 11/1989 | Goodman | |
| 5,085,577 A | 2/1992 | Muller | |
| 5,140,814 A | 8/1992 | Kreutmair et al. | |
| 5,149,261 A | 9/1992 | Suwa et al. | |
| 5,267,851 A | 12/1993 | Washam et al. | |
| 5,288,021 A | 2/1994 | Sood et al. | |
| 5,320,523 A | 6/1994 | Stark | |
| 5,339,630 A | 8/1994 | Pettit | |
| 5,396,794 A | 3/1995 | Nichols | |
| 3,890,088 A | 6/1995 | Ferri | |
| 5,493,171 A | 2/1996 | Wood, III et al. | |
| 5,529,048 A | 6/1996 | Kurihara et al. | |
| 5,553,450 A | 9/1996 | Schnaibel et al. | |
| 5,584,178 A | 12/1996 | Naegeli et al. | |
| 5,590,521 A * | 1/1997 | Schnaibel et al. | 60/274 |
| 5,592,924 A | 1/1997 | Audisio et al. | |
| 5,626,014 A | 5/1997 | Hepburn et al. | |
| 5,693,874 A | 12/1997 | De La Cruz et al. | |
| 5,713,336 A | 2/1998 | King et al. | |
| 5,826,428 A | 10/1998 | Blaschke | |
| 5,860,277 A | 1/1999 | Schnaibel et al. | |
| 5,899,062 A | 5/1999 | Jerger et al. | |
| 5,974,787 A | 11/1999 | Lemire et al. | |
| 5,974,788 A | 11/1999 | Hepburn et al. | |
| 5,998,210 A | 12/1999 | Hepburn et al. | |
| 6,071,113 A | 6/2000 | Tsubouchi et al. | |
| 6,269,633 B1 | 8/2001 | van Nieuwstadt et al. | |
| 6,298,729 B1 | 10/2001 | Locker et al. | |
| 6,301,875 B1 | 10/2001 | Backlund et al. | |
| 6,378,359 B1 | 4/2002 | Dobson et al. | |
| 6,382,182 B1 | 5/2002 | Green et al. | |
| 6,490,858 B2 | 12/2002 | Barrett et al. | |
| 6,532,793 B1 * | 3/2003 | Palocz-Andresen | 73/23.31 |
| 6,568,255 B2 * | 5/2003 | Pallozzi | 73/116 |
| 6,586,254 B1 | 7/2003 | Kumar et al. | |
| 6,594,990 B2 | 7/2003 | Kuenstler et al. | |
| 6,713,025 B1 | 3/2004 | Ivanescu et al. | |
| 6,761,077 B1 * | 7/2004 | Zhu | 73/865.6 |
| 6,823,726 B1 * | 11/2004 | Nagy | 73/117.3 |
| 2001/0054281 A1 | 12/2001 | Adams et al. | |
| 2002/0170344 A1 * | 11/2002 | Pallozzi | 73/116 |
| 2003/0012700 A1 * | 1/2003 | Carmahan | |
| 2003/0079520 A1 | 5/2003 | Ingalis et al. | |
| 2003/0084712 A1 * | 5/2003 | Smith et al. | 73/118.1 |
| 2004/0007056 A1 | 1/2004 | Webb et al. | |
| 2004/0028588 A1 | 2/2004 | Webb et al. | |
| 2004/0237636 A1 * | 12/2004 | Bartley et al. | 73/118.1 |

OTHER PUBLICATIONS

Feb. 1999 marketing brochure of Southwest Research Institute entitled "Fuel/Oil Catalyst Aging System" (FOCAS).

Jovanovic, Modified apparatus for the simulation of engine exhaust emissions, Goriva Maziva, 1984, pp. 33–38, vol. 23(1).

Southwest Research Institute, Unique SwRI–developed procedures and analytical tools to assist vehicle manufcturers in meeting SULEV standards, Southwest Research Institute News, Feb. 23, 1998, Southwest Research Institute, San Antonio, Texas.

Casinhas et al., A Pyrolysis cell as simulator fr an automobile catalytic converter, Vacuum, 1999, pp. 89–97, vol. 52, Elsevier Science Ltd.

Hepburn, A Comparison Between the Combustion of Isooctane, Methanol, and Methane in Pulse Flame Combustors with Closed Loop AF/Control, SAE Technical Paper 920799, 1992, SAE International.

United States Department of Energy, Taking an Alternative Route–Facts about CNG & LPG Conversion, http://pugetsoundcleancities.org/pdfs/cng_lpg_conversion_facts.pdf, Alternative Fuel Inormation, U.S. Department of Energy (date of publication unknown).

Ingalls et al., Development of Catalyst Poisoning Evalution Procedure, 08–9920, Internal Research & Development Program, Annual Report, 1996, p. 53, Southwest Research Institute, San Antonio, Texas.

Ingalls et al., Develop and Test an Apparatus to Evaluate Fuel and Lube Oil Effects on Automotive Catalysts, 08–9949, Internal Research & Development Program, Annual Report, 1996, pp. 53–54, Southwest Research Institute, San Antonio, Texas.

Webb et al., PC–Based Control of a Gasoline–Fueled Burner Aging Test Stand to Simulate Engine Exhaust, LabVIEW for Automotive, Telecommun9ications, Semiconductor, Biomedical and other Applications, National Instruments Virtual Instrumentation Series, 2000, Prentice Hall.

Southwest Research Institute, Further Advances in Exhaust Aftertreatmernt, Promotional Brochure, Feb. 1994, San Antonio, TX.

Southwest Research Institute, Catalytic Converter Durability Testing, Southwest Research Institute –Department of Emissions Research, Promotional Brochure, San Antonio, TX.

Otto et al., A Laboratory Method for the Simulation of Automobile Exhause and Studies of Catalyst Poisoning, Journal of the Air Pollution Control Associaton, Jun 1974, vol. 24, No. 6.

Selby, Development and Significance of the Phosphorus Emission Index of Engine Oils, 13th International Colloquim Tribology –Lubricants, Materials, and Lubrication, 2002, pp. 1–9.

Webb et al., Catalyst Aging Evaluation with Exposure to 0.06 and 0.11 Percent Phosphorus Oils Using the FOCUS Burner System, JSAE 20030269, 2003, SAE 2003–01–1999, Society of Automotive Engineers, Inc.

Drury et al., The Effect of Lubricant Phosphorus Level on Exhaust Emissions in a Field Trial of Gasoline Engine Vehicles, SAE Technical Paper 940745, 1994, SAE International.

Ueda et al., Engine Oil Additive Effects on Deactivatioin of Monolithic Three–Way Catalysts and Oxygen Sensors, SAE Technical Paper 940746, 1994, SAE International.

Williamson, Catalyst Deactivation Due to Glaze Formation From Oil–Derived Phosphorus and Zinc, SAE Technical Paper 841406, 1984, SAE International.

Joy et al., Influence of Phosphorus on Three–Component Control Catalysts: Catalyst Durability and Characterization Studies, SAE Technical Paper 852099, 1985, SAE International.

Cully et al., The Impact of Passenger Car Motor Oil Phosphorus Levels on Engine Durability, Oil Degradation, and Exhaust Emission in a Field Trial, SAE Technical Paper 952344, 1995, SAE International.

Cully et al., The Impact of Pasenger Car Motor Oil Phosphorus Level on Automotive Emissioins Control Systems, SAE Technical Paper 961898, 1996, SAE International.

Ball et al., Application of Accelerated Rapid Aging Test (RAT) Schedules with Poisons: The Effects of Oil Derived Poisons, Thermal Degradation, and Catalyst Volume on FTP Emissioins, SAE Technical Paper 972846, 1997, SAE International.

Beck et al., Impact on Sulfur on the Performance of Vehicle–Aged Palladium Monoliths, Applied Catalysis B: Environmental 6, 1995, vol. 185–200.

Jobson et al, Spatially Resolved Effects of Deactivation on Field–Aged Automotive Catalysts, SAE Technical Paper 910173, SAE International.

Minutes –Oil Protection of Emission System Test II Task Force Held on Aug. 19, 1999, ASTM, Sep. 27, 1999. (Redacted).

Minutes –Oil Protection of Emission System Test II Task Force Held on May 23, 2000, ASTM, Jun. 8, 2000. (Redacted).

Minutes –Oil Protection of Emssion System Test (OPEST) II Task Force Held Apr. 4, 2001, ASTM, May 2, 2001, San Antonio, TX. (Redacted).

* cited by examiner

METHOD FOR ACCELERATED AGING OF CATALYTIC CONVERTERS INCORPORATING ENGINE COLD START SIMULATION

PRIORITY DATA

The present application is a continuation-in-part of U.S. patent application Ser. No. 10/213,890, incorporated herein by reference.

FIELD OF THE INVENTION

The present application relates in general to a method for accelerated aging of an automotive catalytic converter under conditions incorporating cold start simulation.

BACKGROUND

An automotive catalytic converter is an emissions control device that may be incorporated into the exhaust system of a motor vehicle between the exhaust manifold and the muffler. The catalytic converter contains one or more catalysts, such as those based on platinum, palladium, or rhodium, that reduce the levels of hydrocarbons (HC), carbon monoxide (CO) and nitrogen oxides (NOx) in the exhaust gas, thereby reducing the amount of these pollutants which would otherwise be emitted into the atmosphere from the vehicle. In a typical commercial catalytic converter, HC and CO in the exhaust are oxidized to form carbon dioxide (CO2) and water, and NOx are reduced to nitrogen (N2).

As a result of recent regulatory initiatives, motor vehicle emissions control devices, including catalytic converters, are now required to have longer useful lives. US regulatory authorities such as the US Environmental Protection Agency (EPA) and the California Air Resources Board (CARB) now require automotive emission control elements to function up to 150,000 vehicle miles. This requirement, coupled with tighter emission standards, places severe demands on catalytic converters and other exhaust emissions control devices. Catalytic converters lose efficiency primarily by two mechanisms. High exhaust temperatures can cause thermal damage, and a number of components introduced into the typical automotive internal combustion engine exhaust, e.g. from the lubricating oil, can act as poisons to the catalyst present in the converter.

In order to accommodate these stringent EPA requirements, it is important to develop methods for accelerated aging that adequately simulate the impact of various engine operating modes, such as a cold start mode, on the catalytic converter.

In a vehicle, a catalytic converter may experience several thousand cold starts during its lifetime. The conditions experienced by a catalytic converter during an engine cold start in a vehicle may significantly impact aging of the catalytic converter. However, bench engine accelerated aging cycles do not incorporate cold start simulation, and thereby neglect a potentially important aspect of real world catalyst aging. One reason for the omission of cold starts from bench engine aging is that it can take several hours to cool an engine down to near ambient conditions. Including a significant number of cold starts into a bench engine aging cycle would make the overall aging time much too long to be of practical use.

A method is needed to simulate cold starts to more accurately and efficiently assess the impact of cold starts on aging of a catalytic converter.

SUMMARY OF THE INVENTION

The application provides a method for simulating the impact of cold start on a catalytic converter, the method comprising:

providing a non-engine based exhaust component rapid aging system (NEBECRAS) comprising a combustor in fluid communication with an air supplier, a fuel supplier, and a catalytic converter, the combustor being adapted to provide substantially continuous and effective stoichiometric combustion of a fuel feedstream to produce an exhaust product;

subjecting the catalytic converter to a sufficient number of simulated cold start cycles to simulate the effect of cold start aging on the catalytic converter, the cold start cycles comprising:

exposing the catalytic converter at an initial temperature sufficiently low to simulate cold start to a flow of atomized lubricating oil suspended in air at a flow rate for a first flow time effective to simulate the flow of lubricating oil to the catalytic converter upon cold start of an engine;

activating the combustor under conditions effective to simulate rich warm up mode, the activating occurring while continuing the flow of lubricating oil at the flow rate for a second flow time;

halting the flow of lubricating oil; and maintaining the conditions effective to simulate rich warm up mode for a period of time effective to prevent excess build-up of unburned oil on the face of the catalyst, thereby producing a cold start aged catalytic converter.

BRIEF DESCRIPTION

Figure 1:
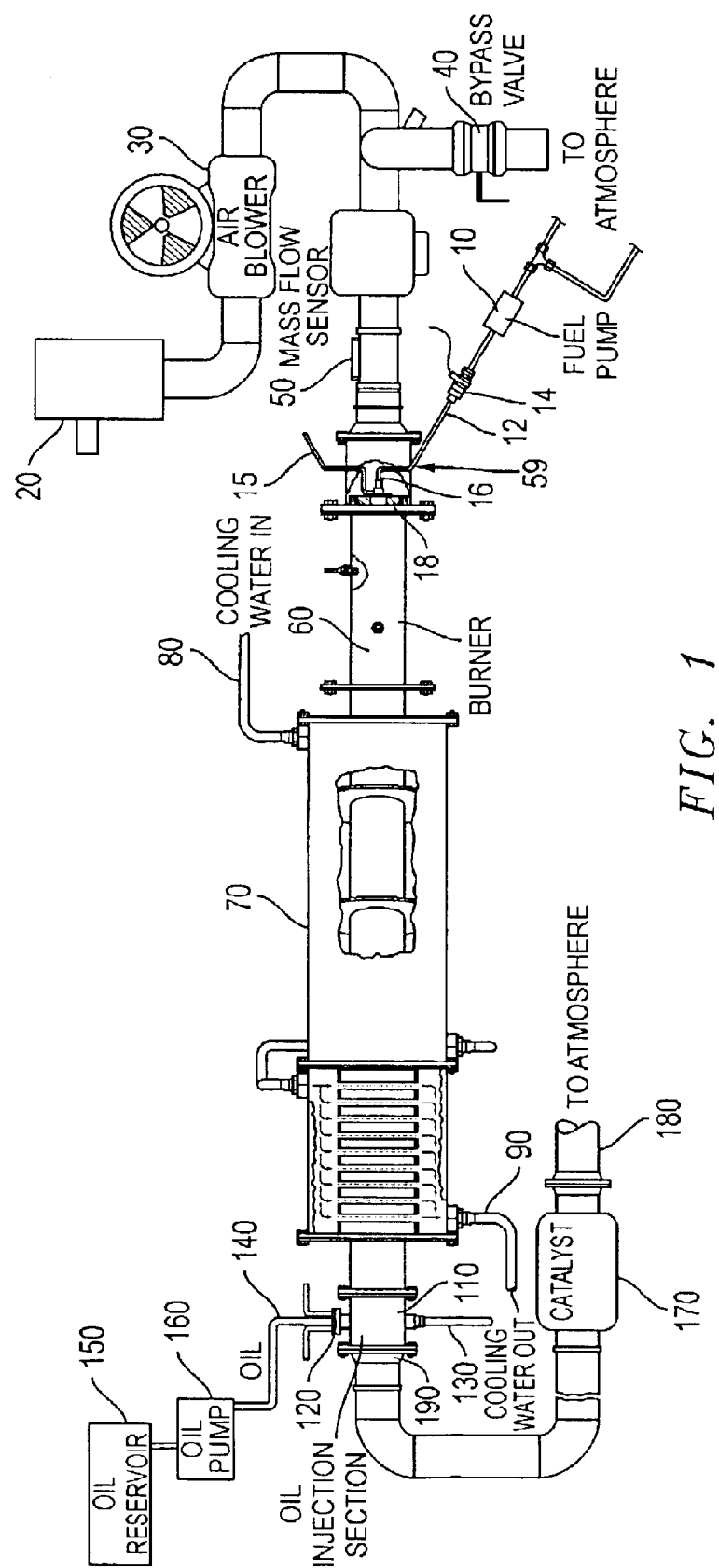
FIG. 1 shows a schematic diagram of one embodiment of the FOCAS® system.
Figure 2:
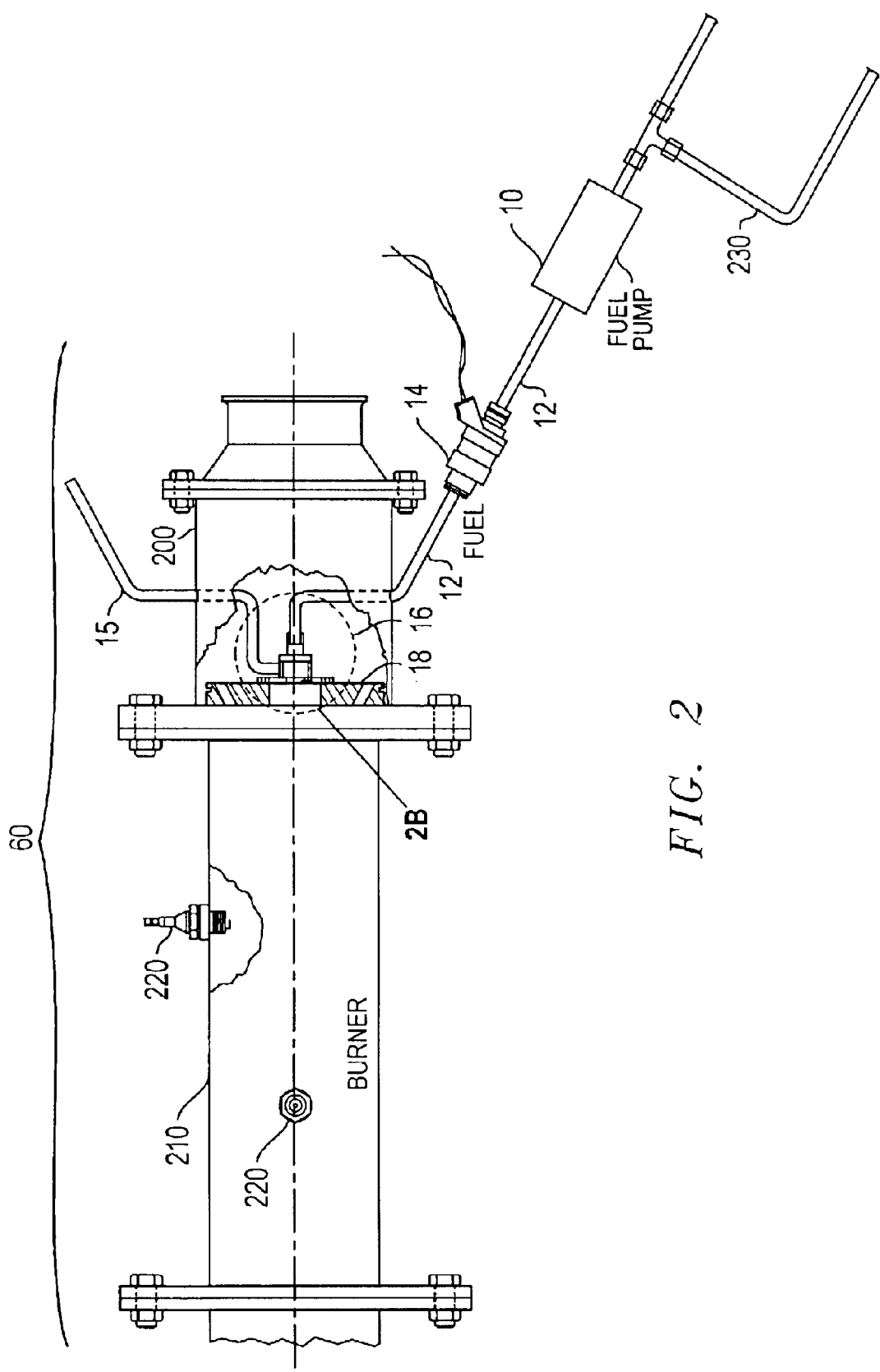
FIG. 2 is a drawing of a preferred embodiment of a burner suitable for use with the present application.

The present application provides a method for using a non-engine based exhaust component rapid aging system (NEBECRAS) to assess the impact of cold start on accelerated aging of a catalytic converter to simulate extended driving conditions.

As used herein the term "catalytic converter" means a full scale emissions control device suitable for incorporation into the exhaust system of a motor vehicle between the exhaust manifold and the muffler. "Extended driving conditions" refers to the equivalent of at least about 50,000 vehicle miles, preferably up to 100,000 vehicle miles, more preferably up to 150,000 vehicle miles.

A preferred NEBRECRAS for use in the method is the "FOCAS® rig," described in U.S. Patent Application Publication No. 20030079520, published May 1, 2003, incorporated herein by reference. Briefly, the FOCAS® rig comprises: (1) an air supply system to provide air for combustion to the burner, (2) a fuel system to provide fuel to the burner, (3) a burner system to combust the air and fuel mixture and provide the proper exhaust gas constituents, (4) a heat exchanger to control the exhaust gas temperature, (5) an oil injection system, and (6) a computerized control system. The foregoing components are described in detail in U.S. Patent Application Publication No. 20030079520, published May 1, 2003, which has been incorporated herein by reference, and will not be described in detail herein.

The FOCAS® rig was developed to evaluate the long term effects of the individual variables on the long term performance of the catalyst. The FOCAS® rig is capable of producing a simulated exhaust gas with a composition and temperature corresponding to that produced by the internal combustion engine of a motor vehicle. Although the FOCAS® rig is preferred, it will be apparent to persons of ordinary skill in the art that any functional and effective NEBECRAS could be adapted for use in accordance with the principles described herein.

In contrast to a bench engine, a NEBECRAS, such as the FOCAS® rig, can perform multiple cold starts in a relatively short period of time. A catalytic converter can be cooled down to near ambient conditions in a matter of minutes using a NEBECRAS such as the FOCAS® system. Therefore, it is practical to include cold starts into an accelerated aging cycle when using a NEBECRAS.

The impact of oil on catalyst aging is typically an uncontrolled factor due to variable oil consumption of the aging test engine. Engine oil contains zinc and phosphorus in the form of ZDP (zinc dialkyldithiophosphate), an engine anti-wear additive. The phosphorus from this additive is a catalyst poison, which tends to form deposits on the catalyst surface. These deposits can delay catalyst light-off and decrease catalyst warmed-up efficiency, e.g., by decreasing the active surface area at the front of the catalyst. Many have attempted to quantify the impact of phosphorus on catalyst performance, with varying success. The main impact of phosphorus and zinc deposition would be expected to affect catalyst light-off times and temperatures as the poisons tend to accumulate on the inlet face of the catalyst. The thermal aging portion of a catalyst aging cycle typically reduces the catalyst surface area and active sites; which results in lower conversion efficiency for all regulated emissions, with $NO_x$ typically being impacted most significantly.

During cold-start, the engine and all exhaust components are cold. The engine is cranked, and some raw oil may be emitted and deposited on the cold catalyst face. The catalyst becomes hot enough to be active shortly thereafter, but probably lights-off while the engine is still in an enrichment mode, which results in the raw oil on the catalyst surface coming up to catalyst operating temperature while the overall exhaust AFR is fuel rich (oxygen depleted). This creates a situation in which the oil on the catalyst face may reach temperatures sufficient to form ash, but there may not be enough oxygen present to fully oxidize the oil. The overall effect of the cold-start mechanism on catalyst degradation is not known, but may be a contributing factor in catalyst performance, and should be evaluated and preferably included in an aging cycle.

Accelerated Aging Cold Start Simulation

A test procedure was developed to simulate automotive gasoline engine cold start conditions. To perform the simulated cold-start, the catalyst is at a temperature sufficiently low to simulate cold start. Suitable temperatures are 100° C. or less. Preferably, the simulation either is begun with the catalyst at a bed temperature of about 70° C. or less, preferably less than 70° C., or is cooled to such a temperature using any suitable cooling arrangement known to persons of ordinary skill in the art. In a preferred embodiment, the catalyst is cooled using an air blower. In order to efficiently cool the catalyst using an air blower, the air blower is set an initial flow rate effective to cool the catalyst to the desired temperature within a reasonable period of time. Preferably, the air blower is set at an initial flow rate of 40 SCFM or more, more preferably 50 SCFM. The air flow is directed onto the catalyst until the desired temperature is reached. With the burner off and the blower on, raw oil is injected from about 2 to about 15 seconds, preferably about 4 seconds. The burner is then lit, and preferably programmed into a rich warm-up mode. A rich warm-up mode for most engine types is an air:fuel ratio (AFR) of from about 9:1 to about 14:1, preferably about 13.75:1. Thereafter, oil injection is continued for a period of time effective to simulate the flow of lubricating oil to the catalytic converter upon cold start of the given engine type, preferably about 20 seconds or more, more preferably about 22 seconds. Thereafter, oil injection is halted and the rich warm-up mode is continued for a period of time effective to prevent excess build-up of unburned oil on the face of the catalyst, preferably for about 20 seconds or more, more preferably for about 60 seconds. The targeted oil injection rate during the cold start simulation is about from about 10 to about 40 grams/hour, preferably from about 28 to about 30 grams/hour. The cycle preferably is repeated a sufficient number of times to simulate the effect of cold start aging. In a preferred embodiment, the number of cycles is from about 1 to about 60,000, preferably from about 35,000 to about 40,000.

The Air Supply System

If the catalyst is in a cool state (preferably 70° C. or less), then it is not necessary to cool the catalyst. However, if the catalyst is at a higher temperature, the catalyst should be cooled before initiating cold start simulation. In order to accomplish this cooling, the air blower suitably is set at an initial flow rate of 40 SCFM or more, preferably 50 SCFM, until the catalyst is cooled to about 70° C. or less.

The Oil Injection System

Once the catalyst is at the desired initial temperature, preferably about 70° C. or less, oil is injected into the blowing air for several seconds. The oil injection system control can be programmed into the computer. The system also can be programmed to inject more or less oil, depending upon the system to be simulated. The targeted oil injection rate in the cold start simulation procedure is from about 10 to about 40 grams/hour, preferably from about 28 to about 30 grams/hour.

After the burner is lit, oil injection at the targeted oil injection rate is continued for about 20 seconds or more, preferably for about 22 seconds, while a fuel rich mode is simulated. Thereafter, oil injection is halted.

The Burner

The burner is specially fabricated, as described in U.S. patent application Ser. No. 20030079520, to produce stoichiometric combustion of fuel and air. In a preferred embodiment, stoichiometric combustion is achieved by injecting the fuel using a swirl stabilized burner comprising a nozzle. As used herein, the term "fuel" means any substance which may be used as a fuel for the internal combustion engine of a motor vehicle, including, but not necessarily limited to, gasoline; synthetic gasoline; diesel; liquefied fuel produced from coal, peat or similar materials; methanol; compressed natural gas; or liquefied petroleum gas. The swirl stabilized burner preferably produces a feedstream flowpath which—after ignition of the fuel to produce a flame—effectively prevents the flame from attaching to the nozzle during combustion of the fuel.

In order to perform the cold start simulation, the burner is lit after the initial, relatively cool oil injection sequence of several seconds. The burner preferably is programmed into a fuel rich mode. A fuel rich mode generally comprises an AFR of 12.5:1 or more, preferably 13.75:1. After the burner is lit, oil injection is continued for about 20 seconds or more, preferably 22 seconds. Thereafter, oil injection is halted and the fuel rich mode is permitted to continue for a period of time effective to prevent excess build-up of unburned oil on the face of the catalyst. The fuel rich mode generally is continued for a period of time of about 20 seconds or more, preferably for about 60 seconds.

During cold start simulations, the spark igniters are activated after the initial "cold" injection of raw lubricating oil is complete. The computer can be programmed to assure proper ignition time substantially immediately after the initial oil injection flow of from about 2 to about 15 seconds, preferably about 4 seconds.

Once lit, the burner 60 and the fuel injector 16 work together to provide substantially continuous and effective stoichiometric combustion.

The Data Acquisition and Control System

The NEBECRAS preferably comprises a programmable data acquisition and control system which may be programmed to incorporate the foregoing parameters for cold start simulation.

Preferably, the data acquisition and control system monitors the test stand for safety (for example by verifying that the burner is lighted and that the exhaust is within specified limits for both temperature and air to fuel ratio). The control system preferably contains an auto start and auto shutdown option.

The controller preferably is provided with a closed-loop fan control to maintain catalyst inlet temperature within ±50° C. of a setpoint, preferably within ±2° C. of a setpoint. The setpoint temperature is dictated by the cycle being simulated.

The application will be better understood with reference to the following working examples, which are illustrative only.

EXAMPLE 1

A study was performed to develop and demonstrate a preliminary catalyst oil-poisoning aging and screening procedure to evaluate and differentiate the effect of oils with varying levels of phosphorus on catalyst performance.

There were four main parts to the initial study. The first part was to develop an aging cycle that included a variety of operating modes, including a cold-start simulation. The second part was to age several catalysts using this cycle and two oils that have field proven performance differences [SAE 961898]. In the third part, the performance of each FOCAS® aged catalyst was evaluated to assess the impact of the two oils. The fourth part was to analyze the mass distribution and ratio of the oil deposits of the aged catalysts, and to compare those distributions to the field aged catalysts. Four catalysts and two oils were aged to 280 hours with 7.57 L of oil, and 560 hours with 15.6 L of oil. The performance results of each catalyst and the mass distribution of deposits showed very good correlation to the field data provided.

Test Catalysts

The catalysts for this program were round, cordierite ceramic, 400 cpsi, 9.23-cm diameter by 10.9-cm long, with a Pt:Pd:Rh (212 g/L at 1:28:1) washcoat. Marmon flanges at the inlet and outlet, and a 2.54-cm length segment of exhaust pipe (on the inlet and outlet) were added to each catalyst to allow installation in the FOCAS® test rig and to provide space for thermocouple taps. Thermocouple taps were installed on the inlet and outlet of each catalyst system. These taps allowed placement of a 0.635-mm diameter, K-type thermocouple into the front face of each substrate, 2.54 cm deep on the centerline, hereafter referred to as the bed temperature thermocouple. The inlet and outlet thermocouples were 3.175-mm diameter, K-type.

Test Fuels and Oils

Pump grade California Phase II fuel was used for all aging procedures. This gasoline is a reformulated, oxygenated fuel with a low sulfur content (about 30 ppm). The stoichiometric AFR for this fuel was 14.45. Table 1 gives the properties of the fuel used during aging and screening at SwRI.

TABLE 1

California Phase II Aging Fuel Properties

| Item | ASTM | CFR Specification Unleaded | Supplier Analysis |
|---|---|---|---|
| Octane, research | D2699 | | 97.0 |
| Octane, motor | D2700 | | 88.2 |
| Antiknock Index | | 91 (min.) | 92.6 |
| Sensitivity | | 7.5 (min.) | 8.8 |
| Pb (organic), g/U.S. gal | D3237 | 0.050 (max.) | NR |
| Distillation Range: | | | |
| IBP° F. | D86 | | 100.1 |
| 10% Point, ° F. | D86 | 130–150 | 140.4 |
| 50% Point, ° F. | D86 | 200–210 | 207.0 |
| 90% Point, ° F. | D86 | 290–300 | 298.7 |
| EP, ° F. | D86 | 390 (max.) | 375.5 |
| Sulfur, ppm | D1266 | 30–40 | 31 |
| Phosphorus, g/U.S. gal | D3231 | 0.005 | 0.0001 |
| RVP, psi | D323 | 6.7–7.0 | 6.83 |
| MTBE, vol.% | | 10.8–11.2 | 10.94 |
| Hydrocarbon Composition: | | | |
| Aromatics, % | D1319 | 35 (max.) | 24.6 |
| Olefins % | D1319 | 10 (max.) | 5.9 |
| Saturates | D1319 | remainder | 69.5 |
| C:H:O, wt. % | 83.68:14.28:2.04 | | |

NR - not reported

The oils used in this program were fully formulated oils referred to as 'OilA' and 'OilB'. OilA contained 0.11 and OilB contained 0.06 weight percent phosphorus, with both containing the same levels of ash-forming compound. Table 2 summarizes some of the physical and chemical properties of the low and the high phosphorus oils tested. Both oils contained similar levels of ash forming compounds, and varied only in ZDP content.

TABLE 2

Test Oil Properties

| Oil Description | OilA | OilB |
|---|---|---|
| Date Supplied | Oct. 3, 2000 | Oct. 3, 2000 |
| ASTM D5185 Elemental Analysis (ppm weight) | | |
| Al | <1 | <1 |
| Sb | <1 | 1 |
| Ba | <1 | <1 |
| B | 122 | 138 |
| Ca | 1199 | 1218 |
| Cr | <1 | <1 |
| Cu | <1 | <1 |
| Fe | 1 | 1 |
| Pb | 5 | 3 |
| Mg | 470 | 466 |
| Mn | <1 | <1 |
| Mo | <1 | <1 |
| Ni | <1 | <1 |
| P | 1157 | 623 |
| Si | 1 | 1 |
| Ag | <1 | <1 |
| Na | 281 | 296 |
| Sn | <1 | <1 |
| Zn | 1276 | 685 |
| K | 6 | 6 |
| Sr | 8 | 8 |
| V | <1 | <1 |
| Ti | <1 | <1 |
| Cd | <1 | <1 |

Air flow provided to the burner of the FOCAS® test rig was preset by the operator and did not vary throughout the test. The computer controlled the burner AFR by modifying the fuel delivered to the air assisted injection system. Some of the advantages of using the FOCAS® based procedure were:

Low maintenance

Ease of thorough cleaning between samples

Flexibility and ease of combining many modes of operation

Precise, accurate, and repeatable operation

Consistent oil consumption rate and characteristics (no fuel dilution, etc)

In addition, there were minimal parameters involved in duplicating a test condition. This should have the effect of reducing the set up conditions that could cause lab-to-lab and test-to-test variability, if the procedure were to be duplicated in another laboratory. The parameters specified in setting up a test included:

Fuel properties

Mass air flow

Exhaust AFR (average EGO voltage by mode)

Oil injection rate

Distance from oil injection point to catalyst inlet

Exhaust temperature at the oil injection point

Catalyst inlet temperature

Catalyst bed temperature during the thermal excursion

To reduce variability in aging, specifications were placed on these parameters. To reduce variability stand-to-stand (or lab-to-lab) specifications would be required on the following sensors/measurement devices: mass air flow (MAF), thermocouples (type and calibration), UEGO and EGO sensors, oil injection rate measurement. Other specifications would obviously be required to create a precise set-up and test sequence, but this list is fairly complete and was provided to stress the minimal number of variables that enter into this type of aging.

Oil Aging Test Cycle

The cycle developed during this program incorporated many modes of operation. The cycle was created based on past oil poisoning experience (both with engines and with the FOCAS® rig), and on engineering consideration of how a catalyst may be poisoned with oil in the field. Many physical criteria were set to achieve good oil vaporization, transport, and deposition. The general physical requirements for the aging as determined based on the above, are given in Table 3.

TABLE 3

Physical Test Conditions

| Physical Parameter | Value |
|---|---|
| Steady-State Exhaust Flow Rate (fully warm) | 49–52 SCFM |
| Steady-State Exhaust Gas Temperature at Oil Injection Point | 580–650° C. |
| Steady-State Catalyst Inlet Temperature (at stoichiometry) | 580–640° C. |
| Oil Consumption Rate | 2.7 L/100 hours |

The aging cycle developed in this work incorporated many modes of operation. The primary mode of operation was steady-state, stoichiometric. The aging cycle, sometimes herein referred to as the MT-cycle (or the Mild-Thermal cycle), which included a mild thermal component to simulate typical temperature excursions encountered in normal driving. The cycle used in this work consisted of five primary modes of operation; cold-start, steady-state stoichiometric, mild thermal excursions, steady-state lean operation, and cool-down.

Figure 3:
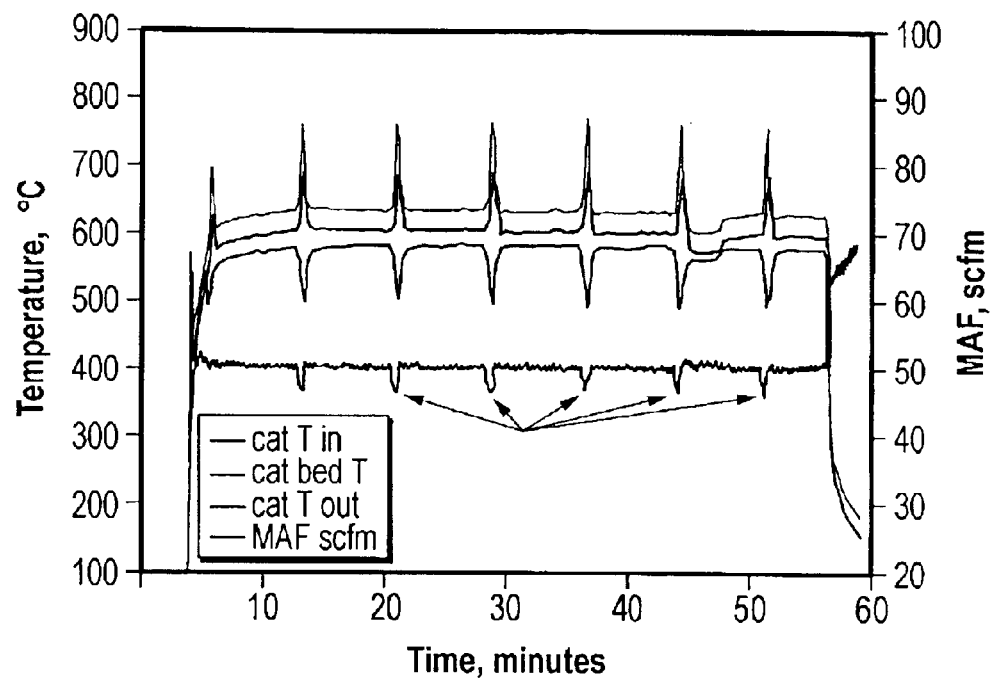
FIG. 3 shows the measured catalyst temperatures during one cycle of aging on the mild-thermal cycle.
Figure 4:
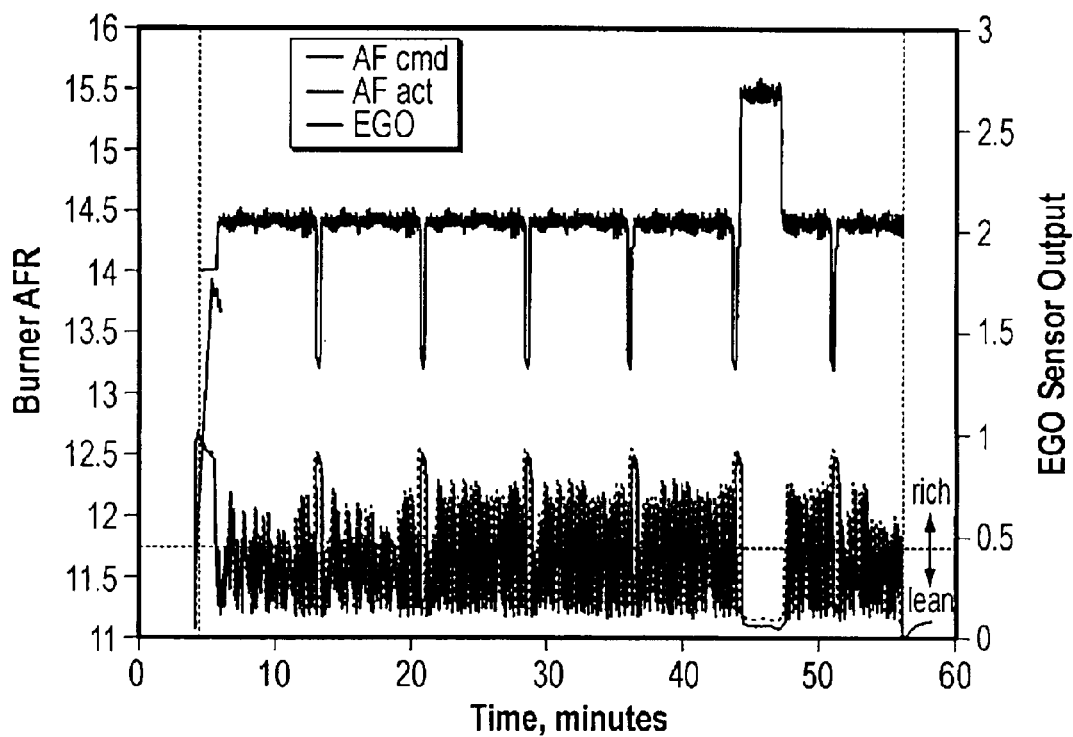
FIG. 4 shows the measured exhaust (burner outlet) AFR profile for the same cycle.

The mild-thermal cycle was one hour in length, and consisted of the following sequence of modes:

1) Cold-start
2) Rich warm-up
3) Thermal Excursion mode
4) Steady-state Stoichiometric mode
5) Thermal Excursion mode
6) Repeat modes 4 and 5 four times
7) Steady-state lean mode
8) Steady-state stoichiometric mode
9) Thermal Excursion mode
10) Steady-state stoichiometric mode
11) Cool down The targeted oil injection rate was 28–30 grams/hour and oil was injected during all modes except for Mode 7, resulting in a consumption of 7.57 L of oil in 280 cycles. FIG. 3 shows the measured catalyst temperatures during one cycle of aging on the mild-thermal cycle. The burner MAF dips (arrows) were caused by backpressure effects from supplemental air injection. FIG. 4 shows the measured exhaust (burner outlet) AFR profile for the same cycle.

Synthetic Gas Reactor (SGR)

In order to develop an aging and test procedure that would replicate the field data with regard to the impact of engine oil poisons on catalysts, a suitable catalyst performance test was required. Oil poisoning mostly affects catalyst light-off, so a light-off test was developed. In previous work (not reported here), several test types were evaluated, including synthetic gas reactor catalyst core steady state lean light-off, steady state rich light-off, and stoichiometric perturbated light-off, and bench engine full size catalyst light-offs. Comparison of the results from the different tests demonstrated that the synthetic gas reactor stoichiometric perturbated light-off procedure gave a very satisfactory correlation to the field data. This test then became the standard test procedure for future work.

The standard test procedure was developed to simulate automotive gasoline engine cold start catalyst light off. In the standard test, a one-inch by one-inch test core taken from the front face, centerline of the aged catalyst was inserted into the reaction tube which is located at the outlet of the main furnace. A synthetic exhaust gas mixture is supplied from two sets of cylinders. One set of cylinders contains propane, propene, carbon monoxide, hydrogen, carbon dioxide, and balance nitrogen, and the other set of cylinders contains nitric oxide, carbon dioxide, and balance nitrogen. A separate oxygen supply is used to control AFR. The propene and nitric oxide are separated to avoid an in-cylinder room temperature reaction between the two gases. Water is added by bubbling the synthetic exhaust gas mixture through a water bath held at a constant temperature to produce approximately ten volume percent steam. The synthetic exhaust gas mixture concentrations were taken from General Motors paper by D. D. Beck, J. W. Sommers, and C. L. DiMaggio, Appl. Catal, 3 (1994) 205, and are given in Table 4. The exhaust gas mixture flows either through the main furnace, or through a heated furnace-bypass line, and then through the catalyst core.

At the start of a test, the sample was installed into the reactor tube using INTERAM® mat mounting to hold it in place. A flow of nitrogen gas with some oxygen added was passed through the sample at about 400° C. to burn off the organic filler in the INTERAM®. Then the first test condition was set. A stoichiometric perturbated gas mixture flowed through the heated furnace-bypass line and through the sample. The sample was allowed to equilibrate at about 150° C. (below the catalyst activation temperature).

TABLE 4

Synthetic Gas Mixture

| Gas Component | Concentration |
|---|---|
| Oxygen ($O_2$) | 0.6% (stoichiometric) |
| Propane ($C_3H_8$) | 167 ppm |
| Propene ($C_3H_3$) | 333 ppm |
| Carbon Monoxide (CO) | 0.6% |
| Nitric Oxide (NO) | 500 ppm |
| Hydrogen ($H_2$) | 0.2% |
| Water ($H_2O$) | 10% |
| Carbon Dioxide ($CO_2$) | 10% |
| Nitrogen ($N_2$) | Balance |

The sample was subjected to one stoichiometric perturbated light-off test as a preconditioning prior to testing with data collection. The test began by switching the gas flow from the furnace-bypass line to the furnace. The furnace was held at a constant temperature of 525° C., and the gas heated up on passing through the furnace. The hot gas impinged on the sample and heated the sample up to a final temperature that was typically slightly in excess of 400° C. This constitutes the dynamic temperature ramp of the light-off test. It was designed to simulate real-world catalyst heat-up in a vehicle exhaust.

The perturbated stoichiometric AFR gas condition was set up by locating the oxygen supply at a point close to the front of the catalyst core, perturbating it using a frequency generator and a solenoid valve, and obtaining the stoichiometric AFR condition by generating a clean square wave on an oscilloscope readout from a standard EGO sensor installed in the gas line immediately after the sample. The perturbation frequency used was 0.5 Hz. The synthetic exhaust gas flow rate was 12 L/min., resulting in a space velocity of 55,942 $hr^{-1}$.

The gas compositions before and after the sample core were measured simultaneously using an emissions cart with dual bench analyzers for measuring simultaneous catalyst inlet and outlet exhaust gas compositions. Flame ionization detectors were used to measure hydrocarbons, and infra-red analyzers were used to measure CO and $CO_2$. $NO_X$ concentrations were determined using chemiluminescence detectors, and $O_2$ concentrations were determined using a polarographic analyzer. The data were collected using a computer with data acquisition control software, and stored to disk for data reduction and interpretation.

From the test procedure described, full dynamic light-off curves were generated from which the $T_{50}$ light-off temperatures (temperature at which 50 percent conversion occurs) for HC, CO and $NO_X$ are read. Conversion efficiencies for HC, CO and $NO_X$, were reported at 350° C.

Aging Analysis and Performance Results

During the aging portion of this program, four catalysts were aged and tested using two candidate oils; Oil 'A' and Oil 'B.' Two of the catalysts were aged for 280 hours and were exposed to 7.57 L of oil (one catalyst on each oil). The second two catalysts were aged to 560 hours and were exposed to 15.14 L of oil (again, one catalyst on each oil). At the midpoint of aging, a fifth catalyst, the 'standard' catalyst, was degreened for 10 hours in the absence of oil to provide baseline performance and elemental information. Degreening was achieved by aging the catalyst using the MT-Cycle with the oil injection turned off. It is understood that fresh, or green catalysts often have unstable performance due to residual elements from the preparation process, and firing/calcining in non-exhaust atmospheres. Some level of degreening is recommended to stabilize the catalyst performance.

Aging data were recorded at 0.5 Hz throughout the aging data sets. At the end of each aging set, the collected data were analyzed to provide average values of the measured parameters:

Burner outlet AFR

EGO voltage

Mass Air Flow, scfm

Catalyst Inlet Temperature, ° C.

Catalyst Bed Temperature, ° C.

The data analysis was performed for all collected data in the active portions of the test cycles (i.e. $T_{bed}>50$ deg C. and 13<AFR<17.5). Table 5 summarizes the measured average data for the four oil-aged catalysts in this program.

TABLE 5

Average Aging Conditions

| Aging Parameter | 280-Hour Aging | | 560-Hour Aging | |
|---|---|---|---|---|
| | OIL A | OIL B | OIL A | OIL B |
| AFR | 14.52 | 14.51 | 14.40 | 14.40 |
| EGO, volts | 0.52 | 0.43 | 0.24 | 0.28 |
| MAF, scfm | 52.0 | 51.7 | 50.1 | 50.2 |
| Catalyst Inlet T., ° C. | 585 | 575 | 575 | 574 |
| Catalyst Bed T., ° C. | 634 | 630 | 625 | 626 |
| Total Aging Hours | 258 | 280 | 563 | 561 |
| Total Oil Consumed, grams | 5840 (6.8 L) | 6560 (7.5 L) | 14000 (15.1 L) | 14000 (15.1 L) |

Oil Consumption Profile

Oil consumption in the FOCAS® rig differs from oil consumption in an engine because in FOCAS® the oil injection systems are separated from the combustion systems. This results in some differences between the burner aging system and an engine aging stand. Because oil consumption is controlled by a peristaltic pump in the FOCAS® rig, the oil consumption rate is easily controlled and any oil consumption profile can be run (or precisely repeated). Also, because the oil reservoir is isolated from the combustion system, the properties of the consumed oil do not vary with time (no oxidation or viscosity variations due to fuel dilution). However, natural oil consumption in an engine occurs through bulk (consumption past the rings or around the valve guides) and through volatile (carried by blowby, through the PCV valve) consumption. Currently the FOCAS® rig only simulates bulk oil consumption, although volatile consumption could be added. In an accelerated engine based program, oil consumption is typically increased through increased bulk consumption, but some volatile consumption still occurs.

Because oil deposition is a physical mechanism, there is a maximum accelerated oil consumption rate (for a given test condition) that can be achieved. When that rate is exceeded, the deposits do not accumulate consistently throughout the catalyst, but instead build-up on the catalyst face, resulting in early cell blockage, and poor axial distribution of deposits. The maximum oil consumption rate in a FOCAS® test is a function of the atomization method, exhaust flowrate, exhaust temperature at the injection point, and the distance between injection and the catalyst inlet (state of oxidation).

Figure 5:
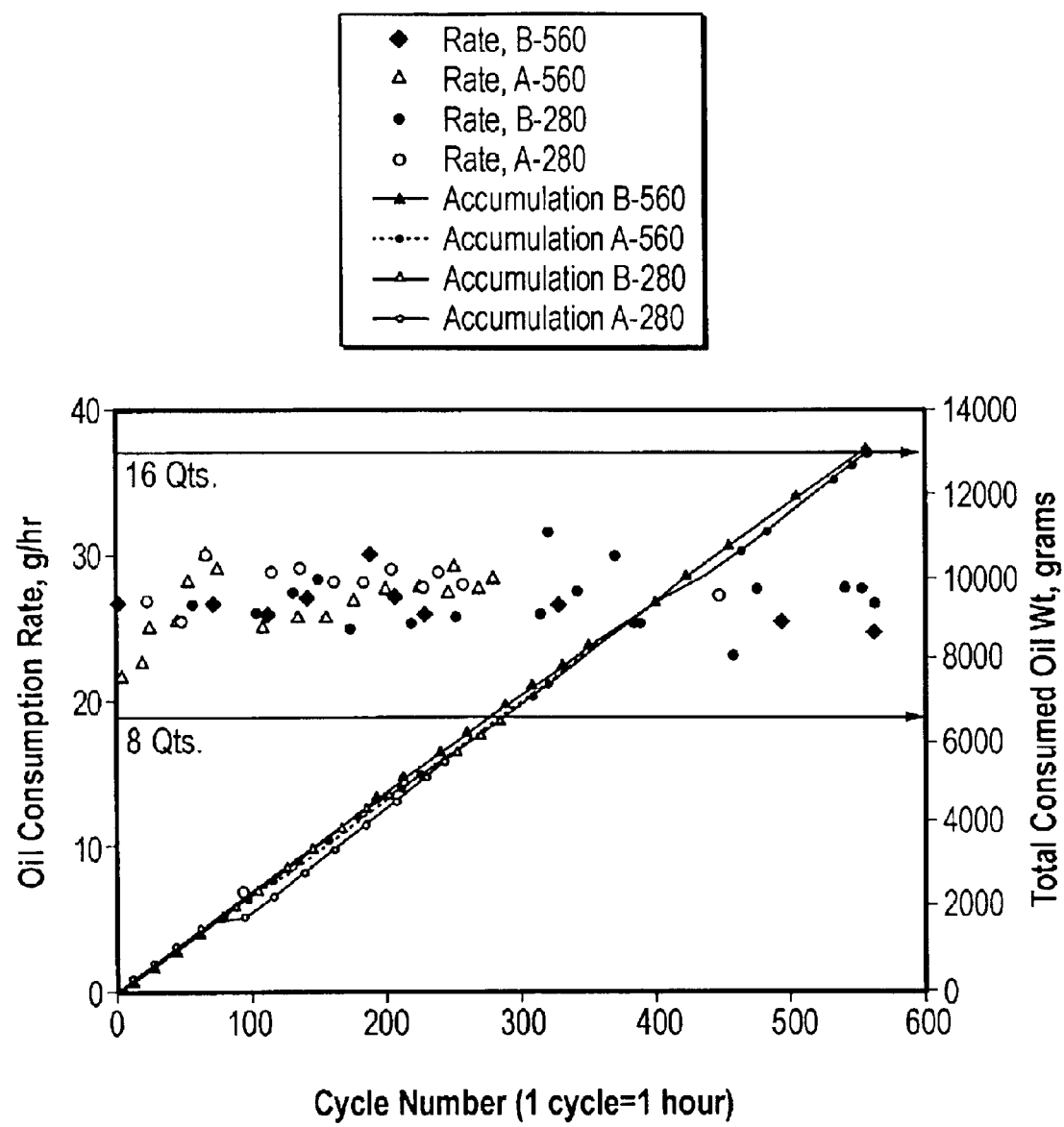
FIG. 5 shows the measured oil consumption profiles for both catalysts during aging.

For this work, the exhaust flowrate, exhaust gas temperature at the oil injection point and distance to the catalyst were set to create an oil/exhaust gas mixture that was adequately vaporized and partially oxidized prior to reaching the catalyst inlet. The transport rate was set with the intent of carrying the oil far enough through the catalyst to create a good axial distribution of the deposit (which could only be determined destructively at the end of the program). In this case, a good axial distribution was defined as one that matched the axial distributions seen in the referenced field data. Next, the oil consumption rate was varied to find a limiting rate, beyond which build-up on the catalyst face was observed. The targeted oil consumption rate was then set slightly below this threshold limit. The limiting rate appeared to be about 35 grams of oil per hour of aging. FIG. 5 shows the measured oil consumption profiles for both catalysts during aging.

Synthetic Gas Reactor Performance

The gas reactor test procedure essentially consisted of monitoring the light-off temperature and steady-state conversion efficiency of a one-inch by one-inch cylindrical core from the center of the front face of the test catalyst. The test performed was a stoichiometric perturbated light-off procedure, where the efficiency of the catalyst core was monitored as the gas temperature was raised from 150° C. to 400° C. Throughout the light-off procedure, the exhaust was perturbated about the stoichiometric AFR point.

The first step in this procedure was to remove the aged catalysts from the canisters, weigh each catalyst, and then carefully remove a one-inch diameter core through the centerline. The front one-inch of the core was tested using the SGR test procedure, and after testing, was carefully repacked with the remainder of the core and submitted for elemental analysis.

Figure 6:
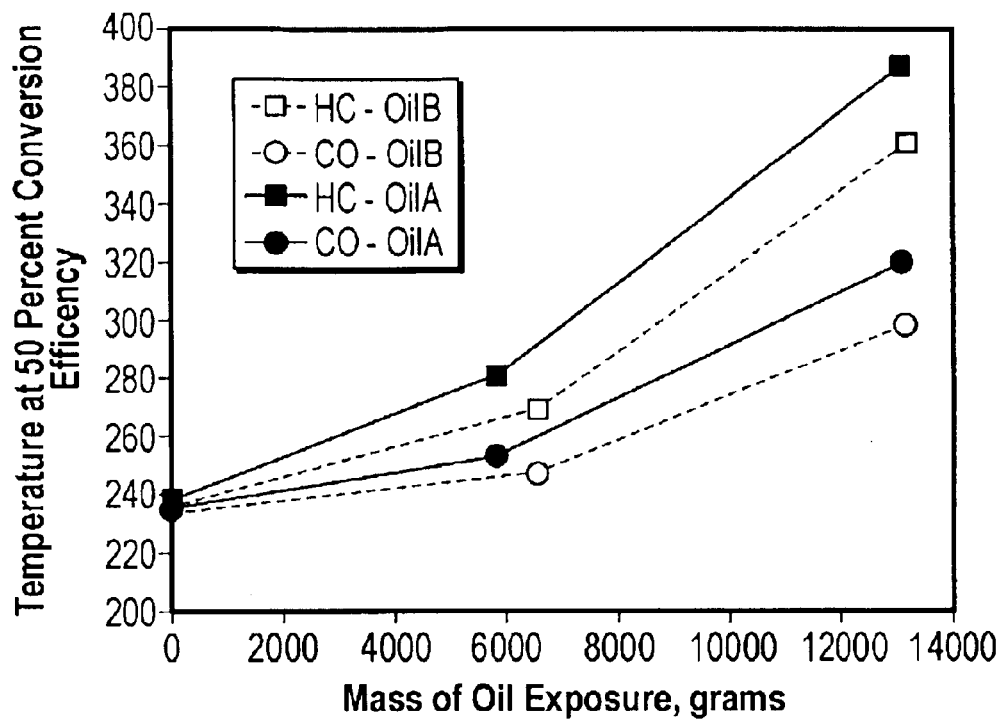
FIGS. 6 and 7 show the measured temperature at conversion efficiency equal to 50 percent (a good catalyst light-off indicator) and the measured steady-state conversion efficiency at 350° C., as a function of exposure to oil mass and aging time.
Figure 7:
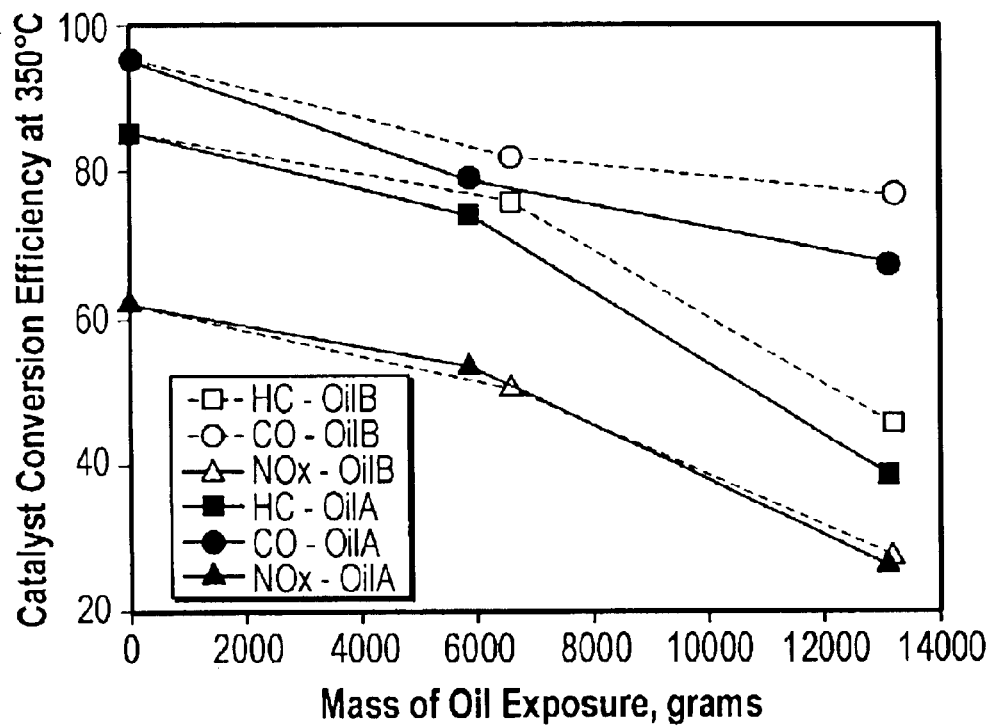

FIGS. 6 and 7 show the measured temperature at conversion efficiency equal to 50 percent (a good catalyst light-off indicator) and the measured steady-state conversion efficiency at 350° C., as a function of exposure to oil mass and aging time. The 0 gram point was obtained using the degreened 'standard' catalyst STD-1. The perturbated light-off results showed that catalyst OilB (low P oil) reached light-off at a lower temperature for both HC and CO than OilA. Steady-state conversion efficiencies also showed a difference in conversion efficiencies, ranked in the same direction. The stoichiometric tests rank catalyst performance for CO and HC as: B>A (for both light-off and steady-state efficiency); for $NO_x$ the ranking is: A~B (for both light-off and steady-state efficiency). Table 6 gives the test results for the light-off temperatures, and steady-state efficiencies. These results show the same trends as those for the field-aged catalysts reported in SAE961898, incorporated herein by reference.

TABLE 6

Synthetic Gas Reactor Performance Evaluations

| Catalyst ID | Stoichiometric Perturbated Light-Off, T50° C. | | | Efficiency at 350° C., % | | |
|---|---|---|---|---|---|---|
| | HC | CO | $NO_x$ | HC | CO | NOx |
| STD-1 | 238 | 235 | 194 | 85 | 95 | 62 |
| OilB-280 | 269 | 247 | 230 | 76 | 82 | 51 |
| OilB-560 | 361 | 299 | na | 46 | 77 | 28 |
| OilA-280 | 281 | 253 | 225 | 74 | 79 | 54 |
| OilB-560 | 388 | 321 | na | 39 | 68 | 27 | na - 50% conversion not achieved

Postmortem Catalyst Evaluations

Figure 8:
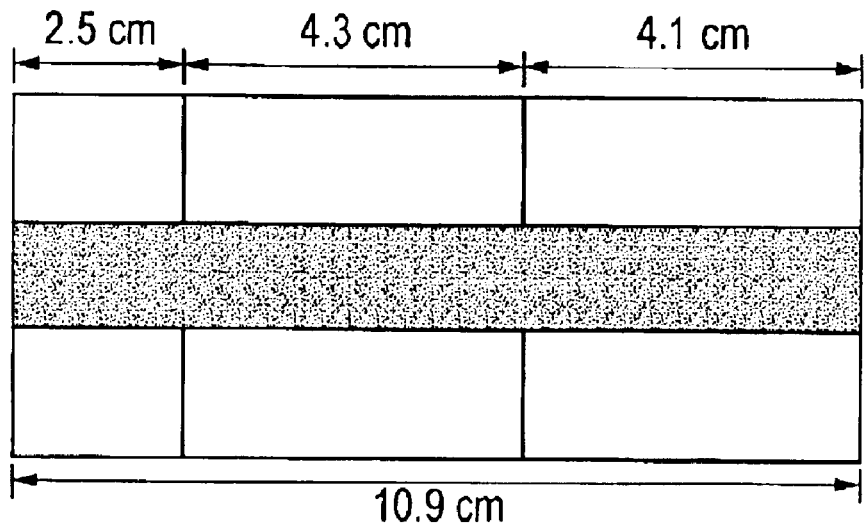
FIG. 8 describes the catalyst sectioning.
Figure 9:
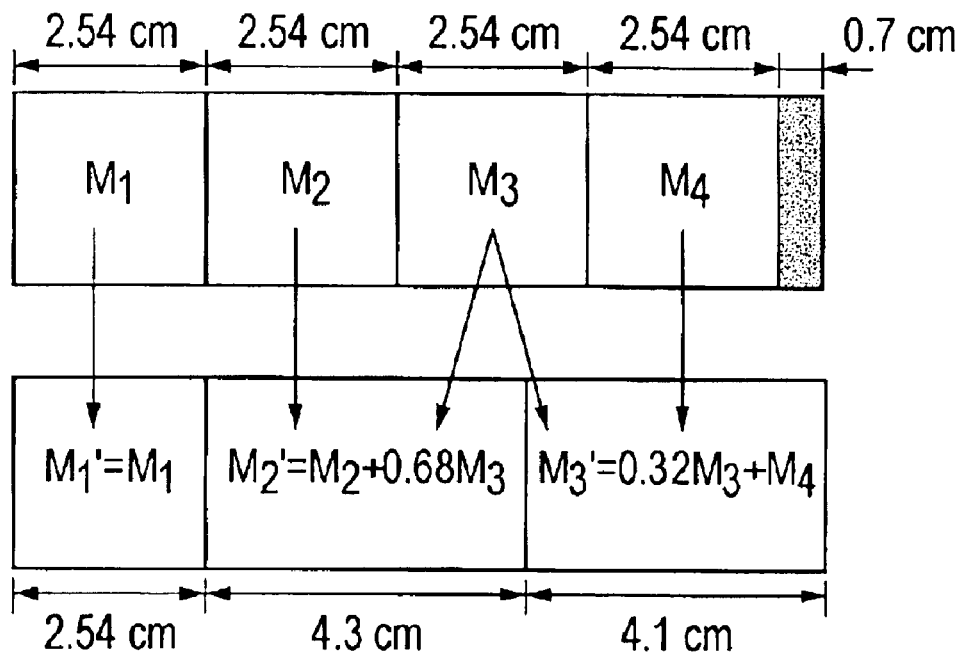
FIG. 9 gives the details of the four core sectioning and the three core calculation.

After all of the performance analyses were completed, the center one-inch diameter core of each catalyst was subjected to composition analysis. The two analyses run for compositional assessment were PIXE (Proton-Induced X-Ray Emissions) and XRF (X-Ray Fluorescence). PIXE and XRF provide information on the composition of the substrate, washcoat, and any deposits on the surface of the catalyst. XRF works by irradiating a sample with high energy photons such as x-rays or gamma rays and observing the resulting x-ray fluorescence emitted by the sample. The XRF and PIXE analysis can both be affected by matrix effects of the catalyst formulation, such that the elemental concentrations reported may be prone to some error. However, the relative values should be consistent within this work as only one catalyst formulation was used. Each element produces x-ray fluorescence photons of distinct energy. PIXE bombards the sample with high energy ions (usually protons), and X-rays of a characteristic energy of the element are emitted. The first set of catalysts (the 280-hour aged) were analyzed using XRF, the second set (the 560-hour aged) were analyzed using both methods (to provide a comparison). However, in splitting the sample between the two methods, the sample size for the XRF analysis was too small, and the accuracy of some measurements was unknown. Overall though, the two methods should be fairly comparable. In this example, the 280-hour results will be provided from the XRF compositional analysis, while the 560 will be from PIXE analysis. Additionally, the first set of catalyst cores (the 280-hour aged catalysts) were divided up unequally in the axial direction, resulting in three segments. FIG. 8 describes the catalyst sectioning. Because the field data is presented as four equally sized (2.54×2.54 cm) segments, the unequal segmenting was not desirable and the second set of cores were sectioned to create more appropriate sized cores. However, the data collected on the four core section parts was compared to the three core data by mathematically calculating the three core profile. The details of the four core sectioning and the three core calculation are given in FIG. 9.

Results of the analyses for selected elements are given in Table 7. The standard catalyst (no oil exposure) was also cored and analyzed to determine the background element levels. The standard catalyst contained none of the elements found in the test oils, as should be expected. In addition to the expected species, these results revealed that catalyst Oil B-560 had lead (Pb) deposits on the surface, the other catalysts did not. The source of this Pb contamination was traced to a transport problem that occurred during the shipment of the last batch of fuel. It was found that the last batch of fuel had 0.016 g/gal Pb (which is less than the California Phase 2 specification of <0.050 g/gal). The presence of this contaminant may have negatively impacted the OilB (low P oil) performance during the 560-hour aging. If so, then the measured performance differential between the high and low P oil at high oil exposure may have been larger.

TABLE 7

Analyzed Weight Percent Results

Elemental Weight Percent, Front 2.54 cm

| Element | OilA-280 a | OilB-280 a | OilA-560 b | OilB-560 b |
|---|---|---|---|---|
| Sulfur, S | 0.34 | 0.42 | 0.24 | 0.16 |
| Phosphorus, P | 1.18 | 0.92 | 3.13 | 1.60 |
| Calcium, Ca | 0.06 | 0.03 | 0.095 | 0.16 |
| Iron, Fe | 0.45 | 0.47 | | |
| Zinc, Zn | 0.45 | 0.34 | 1.01 | 1.27 |
| Lead, Pb | | | 0.03 | 1.27c | a - XRF analysis
b - PIXE analysis
c - Source traced to fuel contamination

Figure 10:
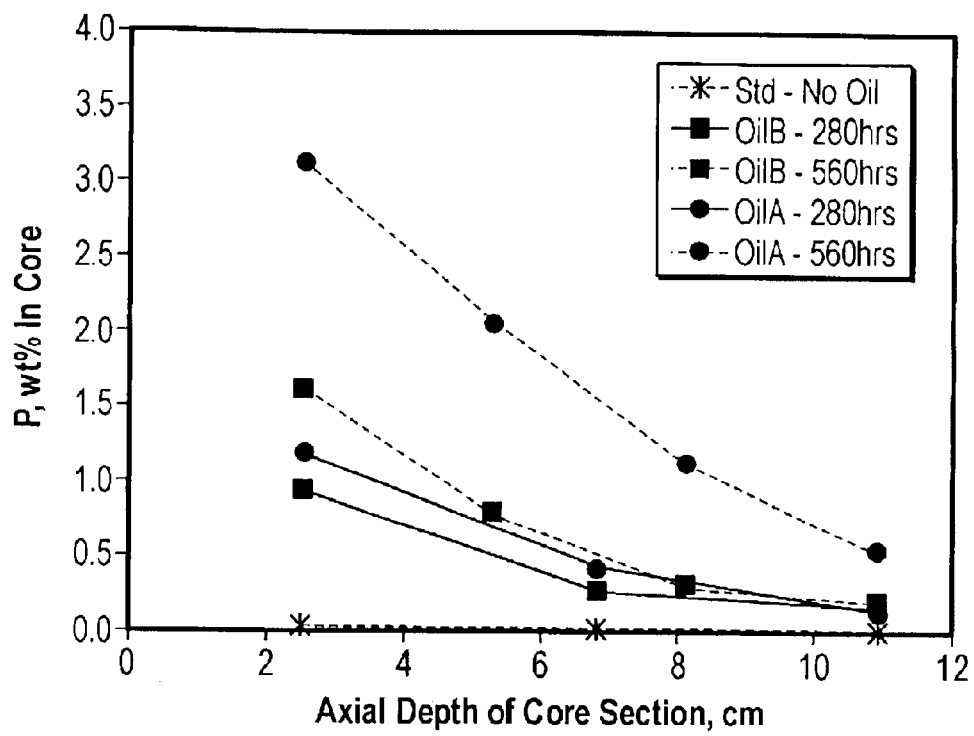
FIGS. 10 and 11 summarize the axial weight distributions of P and Zn for the samples as tested.
Figure 11:
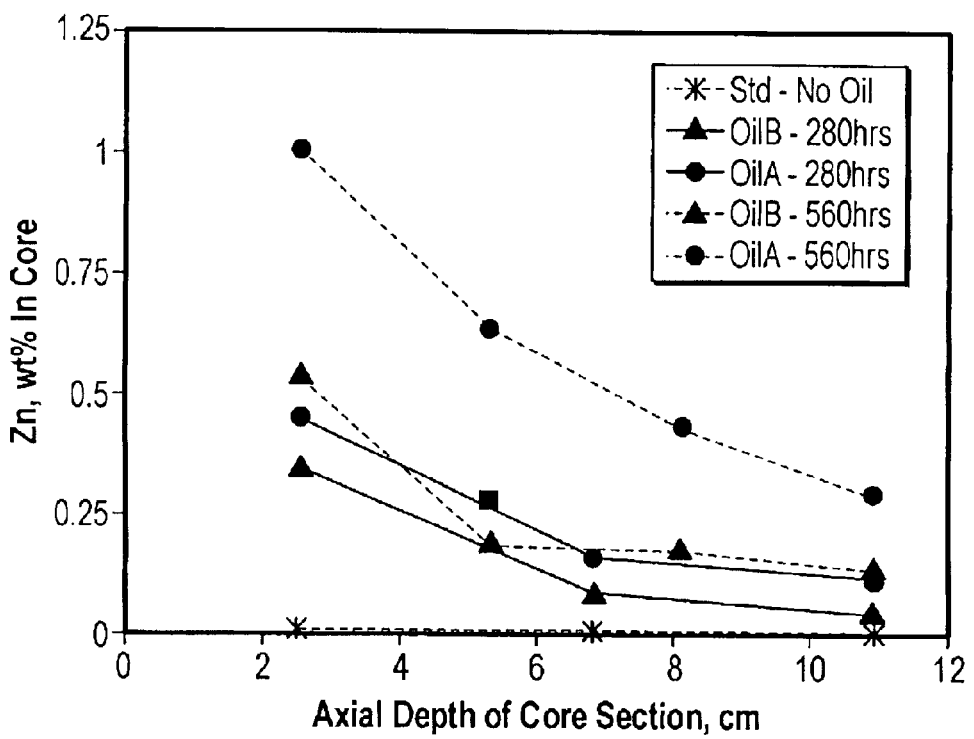
Figure 12:
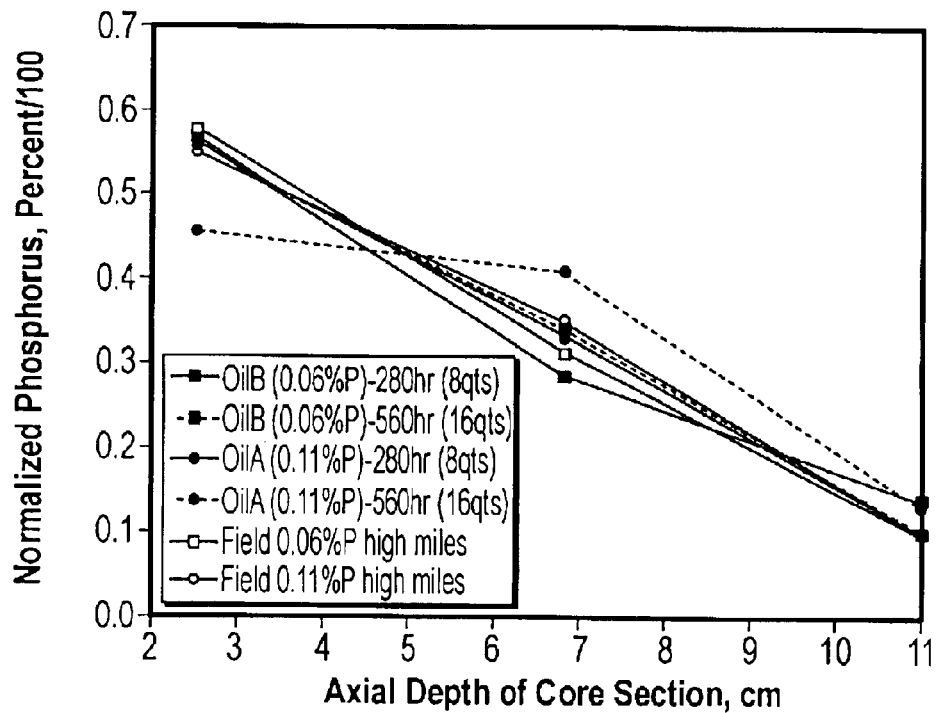
FIG. 12 shows a comparison of phosphorus distribution for each catalyst normalized by weight.

FIGS. 10 and 11 summarize the axial weight distributions of P and Zn for the samples as tested. In examining the figures and trends, it appears that the weight percent (or total mass) in the second segment (5 cm depth) of OilA-560 is a little high, but this value cannot be verified because the center cores were consumed in the analysis. FIG. 12 shows a comparison of phosphorus distribution for each catalyst normalized by weight (with the four core catalysts being converted to a three core interpretation for comparison). This figure shows that the distribution of P decreases with axial depth from the front face, with about 45–55 percent of the total mass of P in the catalyst being in the front one-inch, 30–40 percent in the mid-section and 10 percent in the outlet section. The figure also includes data from the field-aged catalysts reported in SAE961898.It is clear that the FOCAS®-based oil exposure aging procedure correlates very well with the field catalysts with regard to the axial distribution of phosphorus.

Figure 13:
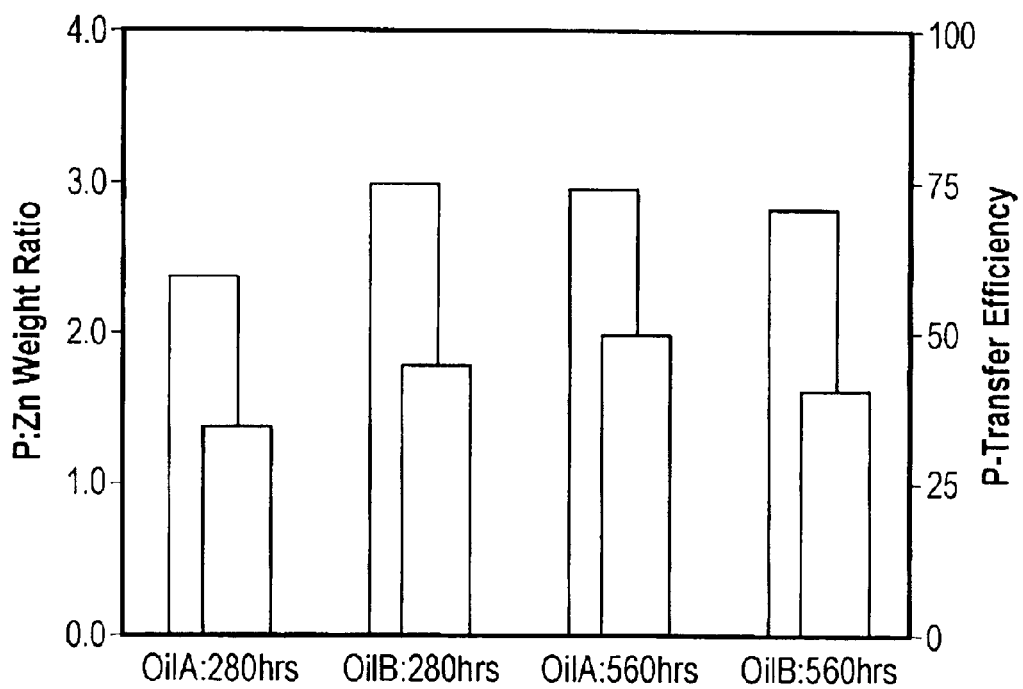
FIG. 13 shows the calculated transfer efficiency (the amount of phosphorus trapped on the catalyst compared to the amount of phosphorus consumed during aging) and the P to Zn ratio.

Another measure of the aging effect is the calculated transfer efficiency (the amount of Phosphorus trapped on the catalyst compared to the amount of Phosphorus consumed during aging) and the P to Zn ratio. FIG. 13 shows these data. The transfer efficiency for the catalysts aged on OilA (0.11% P oil) was 35 to 50 percent, and was 40 to 45 percent for catalysts aged with OilB (0.06% P oil). The P to Zn ratio was about 2.4 to 3.0 (which varies from the ratio of 1 that exists in the base oil). The difference in the P to Zn ratio on the catalyst compared to the base oil indicates that the P containing compounds that exists on the catalyst are different than the compounds that exist in the oil.

Field Aged Catalyst Comparison

Figure 14:
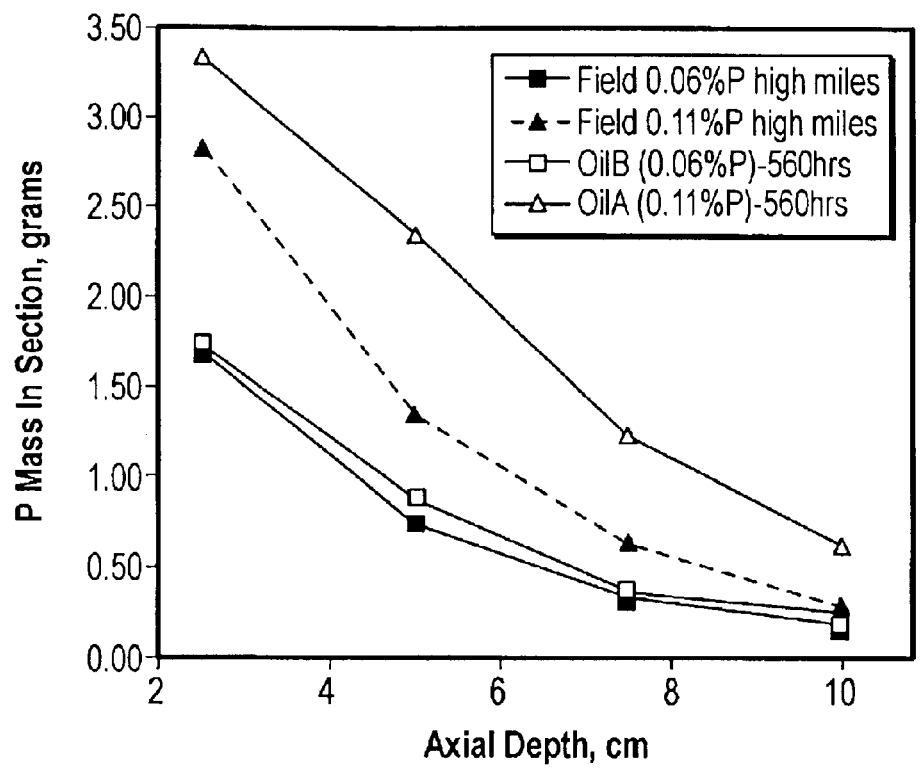
FIG. 14 shows the P mass profiles with axial depth for the 560-hour FOCAS® aged catalysts compared to the profiles estimated from SAE paper 96188.

The 280-hour aged catalysts were initially compared to data interpreted from Cully, S., McDonnell, T., Ball, D., Kirby, C., Hawes, S., "The Impact of Passenger Car Motor Oil Phosphorus Levels on Automotive Emissions Control Systems," SAE 961898, incorporated herein by reference, and found to contain about half the mass of oil deposits of the high mileage field-aged catalysts presented in the paper. It was then assumed that doubling the aging to 560 hours and the oil exposure to 15.1 L, would produce an aging level that could be compared to the field-aged results. FIG. 14 shows the P mass profiles with axial depth for the 560-hour FOCAS® aged catalysts compared to the profiles estimated from SAE paper 96188, incorporated herein by reference. The low-P profiles compared very well, matching levels very closely. The high-P oil profile comparison was reasonable, but there appeared to be more deposit on the FOCAS® aged catalyst compared to the interpreted field aged catalyst. However, if these profiles are normalized by weight, then the basic shape of all the P-profiles can be compared. Referring back to FIG. 12, it can be seen that the field interpreted data were included. This figure compares the normalized 3-core profile for all four FOCAS® aged catalysts, with the field-aged catalysts. In this figure it can be seen that the profiles for all the catalysts agree well (with the exception of OilB-560, which appears to have slightly high mass in segment 2). It can also be seen that the normalized percentage of the P deposited in the front 2.54 cm of the catalyst is typically about 55 percent (except catalyst OilB-560).

Figure 15:
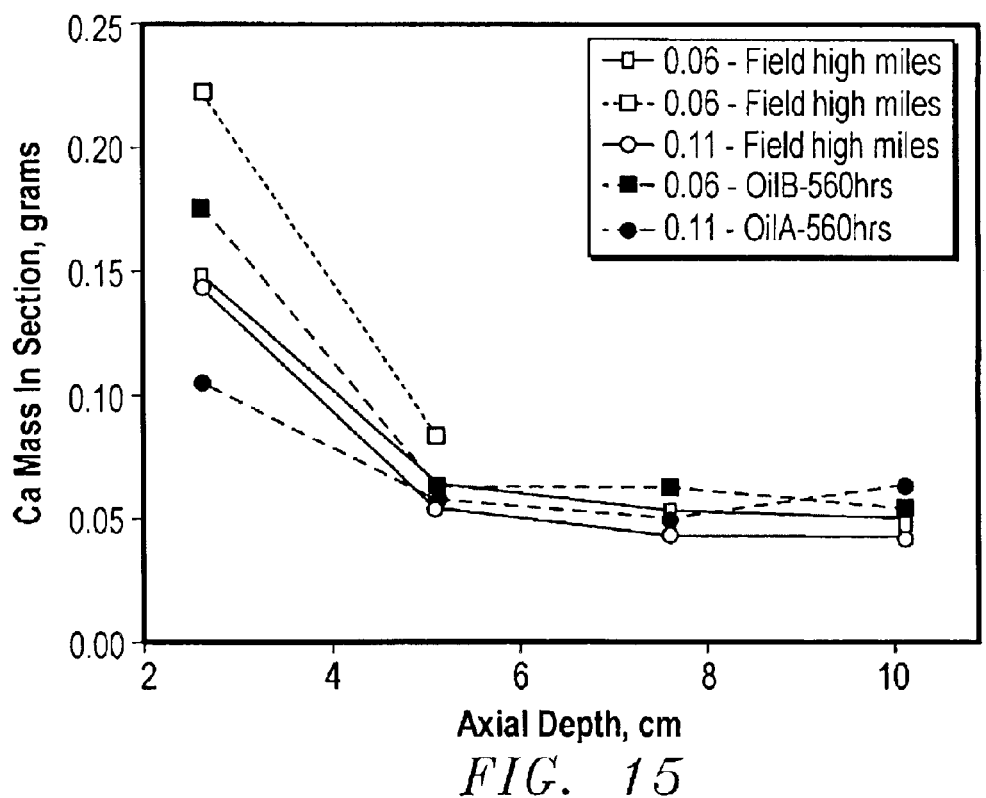
FIG. 15 shows a comparison of the measured Ca profile for the FOCAS® aged 560-hour catalysts to the field aged catalysts.

FIG. 15 shows a comparison of the measured Ca profile for the FOCAS® aged 560 hour catalysts to the field aged catalysts. These profiles also agree well. There was no information provided on Zn profiles for the field-aged catalysts. Refer back to FIGS. 17 and 18 for a comparison of observed emissions trend to the field data. For $NO_x$, the field data showed that there was somewhat of a relationship between oil consumption and the $NO_x$ degradation factor. However, the regression of phosphorus throughput versus $NO_x$ degradation was not statistically significant[2] (i.e., there was little performance differential for $NO_x$ between the oils at a given age, but there was a degradation with aging). The data shown in FIG. 7 for $NO_x$ agrees with this trend, there is a degradation with oil exposure but the degradation is not a function of the phosphorus level in the oil.

On the other hand, HC and CO show a degradation with oil exposure and with P exposure in the field catalysts. For the field catalysts, it was found that the high mileage catalysts aged on the High P oil (OilA) took longer to light-off and performed at a lower efficiency on the FTP. FIG. 6 shows that the catalysts aged using OilA on the FOCAS® rig reached light-off (defined here as achieving 50 percent catalyst conversion efficiency) at higher temperatures than the catalysts aged on OilB. Additionally, FIG. 7 shows that the catalysts aged using OilB also achieved higher steady-state conversion efficiencies. These results show similar trend compared to the field results.

CONCLUSIONS

The initial study was designed to determine whether a procedure could be developed to differentiate the effects of lubricating oil on catalyst performance, using a FOCAS®-based approach.

The FOCAS® based approach resulted in the successful differentiation of two oils with different phosphorus concentrations, which was in line with the field data.

Based on the oils tested, the FOCAS® procedure was able to:

Differentiate the effect of phosphorus in oil on catalyst performance (though not statistically verified), in agreement with the field data.

Demonstrate emissions performance degradation with exposure to oil.

Demonstrate deposit distribution on catalysts similar to the field.

Demonstrate reproducibility of test conditions.

Persons of ordinary skill in the art will recognize that many modifications may be made to the present application without departing from the spirit and scope of the application. The embodiment described herein is meant to be illustrative only and should not be taken as limiting the application, which is defined in the claims.

We claim:

1. A method for simulating the impact of cold start on a catalytic converter, the method comprising:

providing a non-engine based exhaust component rapid aging system comprising a combustor in fluid communication with an air supplier, a fuel supplier and a catalytic converter, said combustor producing a flowpath comprising at least a first collapse, an expansion, and a second collapse and providing substantially continuous and effective stoichiometric combustion of a fuel feedstream to produce an exhaust product;

subjecting the catalytic converter to a sufficient number of simulated cold start cycles to simulate the effect of cold start aging on said catalytic converter, the simulated cold start cycles comprising:

exposing said catalytic converter at an initial temperature sufficiently low to simulate cold start to a flow of atomized lubricating oil suspended in air at a flow rate for a first flow time effective to simulate the flow of lubricating oil to the catalytic converter upon cold start of an engine;

activating said combustor under conditions effective to simulate rich warm up mode, said activating occurring while continuing said flow of lubricating oil at said flow rate for second flow time;

halting said flow of lubricating oil; and maintaining said conditions effective to simulate rich warm up mode for a period of time effective to prevent excess build-up of unburned oil on the face of the catalyst, thereby producing a cold start aged catalytic converter; and evaluating the efficiency of the cold start aged catalytic converter.

2. The method of claim 1 wherein said initial temperature is 100° C. or less.

3. The method of claim 1 wherein said initial temperature is 70° C. or less.

4. The method of claim 1 wherein said flow rate of the lubricating oil is from about 10 to about 40 grams/hour.

5. The method of claim 2 wherein said flow rate of the lubricating oil is from about 10 to about 40 grams/hour.

6. The method of claim 2 wherein said flow rate of the lubricating oil is from about 28 to about 30 grams/hour.

7. The method of claim 1 wherein said first flow time is from about 2 seconds to about 15 seconds.

8. The method of claim 1 wherein said first flow time is about 4 seconds.

9. The method of claim 2 wherein said first flow time is from about 2 seconds to about 15 seconds.

10. The method of claim 2 wherein said second flow time is about 20 seconds or more.

11. The method of claim 5 wherein said first flow time is from about 2 seconds to about 15 seconds.

12. The method of claim 5 wherein said second flow time is about 20 seconds or more.

13. The method of claim 11 wherein said second flow time is about 20 seconds or more.

14. The method of claim 2 wherein the conditions effective to simulate rich warm up mode comprise an air:fuel ratio (AFR) of from about 9:1 to about 14:1.

15. The method of claim 3 wherein the conditions effective to simulate rich warm up mode comprise an air fuel ratio (AFR) of from about 9:1 to about 14:1.

16. The method of claim 5 wherein the conditions effective to simulate rich warm up mode comprise an air fuel ratio (AFR) of from about 9:1 to about 14:1.

17. The method of claim 6 wherein the conditions effective to simulate rich warm up mode comprise an air fuel ratio (AFR) of from about 9:1 to about 14:1.

18. The method of claim 13 wherein the conditions effective to simulate rich warm up mode comprise an air fuel ratio (AFR) of from about 9:1 to about 14:1.

19. The method of claim 1 wherein said period of time is about 20 seconds or more.

20. The method of claim 1 wherein said period of time is about 60 seconds.

21. The method of claim 13 wherein said period of time is about 20 seconds or more.

22. The method of claim 13 wherein said period of time is about 60 seconds.

23. The method of claim 1 further comprising cooling said catalytic converter to said initial temperature.

24. The method of claim 23 wherein said cooling comprising blowing air onto said catalytic converter at an initial air flow rate of 40 SCFM or more.

25. The method of claim 24 wherein said initial air flow rate is 50 SCFM.

26. The method of claim 2 further comprising cooling said catalytic converter to said initial temperature.

27. The method of claim 26 wherein said cooling comprising blowing air onto said catalytic converter at on initial air flow rate of 40 SCFM or more.

28. The method of claim 5 further comprising cooling said catalytic converter to said initial temperature.

29. The method of claim 28 wherein said cooling comprising blowing air onto said catalytic converter at an initial air flow rate of 40 SCFM or more.

30. The method of claim 11 further comprising cooling said catalytic converter to said initial temperature.

31. The method of claim 30 wherein said cooling comprising blowing air onto said catalytic converter at an initial air flow rate of 40 SCFM or more.

32. The method of claim 13 further comprising cooling said catalytic converter to said initial temperature.

33. The method of claim 32 wherein said cooling comprising blowing air onto said catalytic converter at an initial air flow rate of 40 SCFM or more.

34. The method of claim 1 wherein said sufficient number of simulated cold start cycles is up to about 60,000 cycles.

35. The method of claim 1 wherein said sufficient number of simulated cold start cycles is from about 35,000 to about 40,000 cycles.

36. The method of claim 32 wherein said sufficient number of simulated cold start cycles is up to about 60,000 cycles.

37. The method of claim 32 wherein, said sufficient number of simulated cold start cycles is from about 35,000 to about 40,000 cycles.

38. A method for simulating the impact of cold start on a catalytic converter, the method comprising:

providing a non-engine based exhaust component rapid aging system (NEBECRAS) comprising a combustor in fluid communication with an air supplier, a fuel supplier, and a catalytic converter, said combustor producing a flowpath comprising at least a first collapse, an expansion, and a second collapse and providing substantially continuous and effective stoichiometric combustion of a fuel feedstream to produce an exhaust product;

subjecting said catalytic converter to a sufficient number of simulated cold start cycles co simulate the effect of cold start aging on the catalytic converter, the simulated cold start cycles comprising:

exposing said catalytic converter at an initial temperature of about 70° C. or less to a flow of atomized lubricating oil suspended in air at a flow rate of from about 10 to about 40 grams/hour for a first flow time effective to simulate the flow of lubricating oil to the catalytic converter upon colds tart of an engine;

activating said combustor under conditions effective to simulate rich warm up mode, said activating occurring while continuing said flow of lubricating oil at said flow rate for second flow time;

halting said flow of lubricating oil; and maintaining said conditions effective to simulate rich warm up mode for a period of time effective to prevent excess build-up of unburned oil on the face of the catalyst, thereby producing a cold start aged catalytic converter; and, evaluating the efficiency of the cold start aged catalytic converter.

39. The method of claim 38 wherein said flow rate of the lubricating oil is from about 28 to about 30 grams/hour.

40. The method of claim 38 wherein said first flow time is from about 2 seconds to about 15 seconds.

41. The method of claim 39 wherein said first flow time is from about 2 seconds to about 15 seconds.

42. The method of claim 39 wherein said first flow time is about 4 seconds.

43. The method of claim 38 wherein said second flow time is about 20 seconds or more.

44. The method of claim 39 wherein said second flow time is about 20 seconds or more.

45. The method of claim 40 wherein said second flow time is about 20 seconds or more.

46. The method of claim 41 wherein said second flow time is about 20 seconds or more.

47. The method of claim 42 wherein said second flow time is about 20 seconds or more.

48. The method of claim 42 wherein said second flow time is 22 seconds.

49. The method of claim 38 wherein the conditions effective to simulate rich warm up mode comprise an air fuel ratio (AFR) of from about 9:1 to about 14:1.

50. The method of claim 40 wherein the conditions effective to simulate rich warm up mode comprise an air:fuel ratio (AFR) of from about 9:1 to about 14:1.

51. The method of claim 45 wherein the conditions effective to simulate rich warm up mode comprise an air:fuel ratio (AFR) of from about 9:1 to about 4:1.

52. The method of claim 47 wherein the conditions effective to simulate rich warm up mode comprise an air:fuel ratio (AFR) of from about 9:1to about 4:1.

53. The method of claim 38 wherein said period of time is about 20 seconds or more.

54. The method of claim 38 wherein said period of time is about 60 seconds.

55. The method of claim 40 wherein said period of time is about 20 seconds or more.

56. The method of claim 45 wherein said period of time is about 20 seconds or more.

57. The method of claim 47 wherein said period of time is about 20 seconds or more.

58. The method of claim 51 wherein said period of time is about 20 seconds or more.

59. The method of claim 52 wherein said period of time is about 60 seconds.

60. The method of claim 38 further comprising cooling said catalytic converter to said initial temperature.

61. The method of claim 60 wherein said cooling comprising blowing air onto said catalytic converter at an initial air flow rate of 40 SCFM or more.

62. The method of claim 61 wherein said initial air flow rate is 50 SCFM.

63. The method of claim 40 further comprising cooling said catalytic converter to said initial temperature.

64. The method of claim 63 wherein said cooling comprising blowing air onto said catalytic converter at an initial air flow rate of 40 SCFM or more.

65. The method of claim 64 wherein said initial air flow rate is 50 SCFM.

66. The method of claim 45 further comprising cooling said catalytic converter to said initial temperature.

67. The method of claim 66 wherein said cooling comprising blowing air onto said catalytic converter at an initial air flow rate of 40 SCFM or more.

68. The method of claim 67 wherein said initial air flow rate is 50 SCFM.

69. The method of claim 38 wherein said sufficient number of cold start cycles is up to about 60,000 cycles.

70. The method of claim 38 wherein said sufficient number of cold start cycles is from about 35,000 to about 40,000 cycles.

71. The method of claim 66 wherein said sufficient number of simulated cold start cycles is up to about 60,000 cycles.

72. The method of claim 66 wherein said sufficient number of cold start cycles is from about 35,000 to about 40,000 cycles.

73. A method for simulating catalytic converter aging using a non-engine based exhaust component rapid aging system (NEBECRAS), the method comprising:

exposing said catalytic converter to a sufficient number of simulated cold start cycles to simulate the effect of cold start aging on the catalytic converter, said simulated cold start cycles comprising:

exposing said catalytic converter at an initial temperature of 70° C. or less to a flow of atomized lubricating oil suspended in air at a flow rate for a first flow time effective to simulate the flow of lubricating oil to the catalytic converter upon cold start of an engine;

supplying fuel to a combustor via a nozzle at an air to fuel ratio (AFR) and under conditions effective to simulate rich warm up mode and to produce a feedstream flowpath comprising a first collapse, an expansion and a second collapse, said feedstream flowpath comprising a flame, said feedstream flowpath being effective to prevent the flame from attaching to the nozzle during combustion of the fuel;

substantially simultaneously continuing said flow of lubricating oil at said flow rate for second flow time;

halting said flow of lubricating oil;

maintaining said conditions effective to simulate rich warm up mode for a period of time effective to prevent excess build-up of unburned oil on the face of the catalyst and to produce an exhaust product; and exposing a catalytic convener to the exhaust product, producing a cold start aged catalyst.

74. The method of claim 73 further comprising evaluating the efficiency of the cold start aged catalytic converter.

75. The method of claim 74 wherein said flow rate of the lubricating oil is from about 10 to about 40 grams/hour.

76. The method of claim 74 wherein said flow rate of the lubricating oil is from about 28 to about 30 grams/hour.

77. The method of claim 74 wherein said first flow time is from about 2 seconds to about 15 seconds.

78. The method of claim 74 wherein said first flow time is about 4 seconds.

79. The method of claim 74 wherein said second flow time is about 20 seconds or more.

80. The method of claim 74 wherein said second flow time is 22 seconds.

81. The method of claim 75 wherein said first flow time is from about 2 seconds to about 15 seconds.

82. The method of claim 75 wherein said first flow time is about 4 seconds.

83. The method of claim 74 wherein said second flow time is about 20 seconds or more.

84. The method of claim 75 wherein said second flow time is about 20 seconds or more.

85. The method of claim 81 wherein said second flow time is about 20 seconds or more.

86. The method of claim 74 wherein the conditions effective to simulate rich warm up mode comprise an air:fuel ratio (AFR) of from about 9:1 to about 14:1.

87. The method of claim 75 wherein the conditions effective to simulate rich warm up mode comprise an air:fuel ratio (AFR) of from about 9:1 to about 14:1.

88. The method of claim 81 wherein the conditions effective to simulate rich warm up mode comprise an air:fuel ratio (AFR) of from about 9:1 to about 4:1.

89. The method of claim 85 wherein the conditions effective to simulate rich warm up mode comprise an air:fuel ratio (AFR) of from about 9:1 to about 14:1.

90. The method of claim 85 wherein the conditions effective to simulate rich warm up mode comprise an AFR of about 13.15:1.

91. The method of claim 74 wherein said period of time is about 20 seconds or more.

92. The method of claim 74 wherein said period of time is about 60 seconds.

93. The method of claim 75 wherein said period of time is about 20 seconds or more.

94. The method of claim 75 wherein said period of time is about 60 seconds.

95. The method of claim 89 wherein said period of time is about 20 seconds or more.

96. The method of claim 89 wherein said period of time is about 60 seconds.

97. The method of claim 74 further comprising cooling said catalytic converter to said initial temperature.

98. The method of claim 97 wherein said cooling comprising blowing air onto said catalytic converter at an initial air flow rate of 40 SCFM or more.

99. The method of claim 98 wherein said initial air flow rate is 50 SCFM.

100. The method of claim 75 further comprising cooling said catalytic converter to said initial temperature.

101. The method of claim 100 wherein said cooling comprising blowing air onto said catalytic converter at an initial air flow rate of 40 SCFM or more.

102. The method of claim 101 wherein said initial air flow rate is 50 SCFM.

103. The method of claim 79 further comprising cooling said catalytic converter to said initial temperature.

104. The method of claim 103 wherein said cooling comprising blowing air onto said catalytic converter at an initial air flow rate of 40 SCFM or more.

105. The method of claim 103 wherein said initial air flow rate is 50 SCFM.

106. The method of claim 85 further comprising cooling said catalytic converter to said initial temperature.

107. The method of claim 106 wherein said cooling comprising blowing air onto said catalytic converter at an initial air flow rate of 40 SCFM or more.

108. The method of claim 107 wherein said initial air flow rate is 50 SCFM.

109. The method of claim 74 further comprising providing substantially continuous automated fuel metering control.

110. The method of claim 85 further comprising providing substantially continuous automated fuel metering control.

111. The method of claim 106 further comprising providing substantially continuous automated fuel metering control.

112. The method of claim 74 further comprising providing substantially continuous automated safety control.

113. The method of claim 85 further comprising providing substantially continuous automated safety control.

114. The method of claim 111 further comprising providing substantially continuous automated safety control.

115. The method of claim 114 further comprising providing substantially continuous automated safety control.

116. The method of claim 74 wherein said sufficient number of cold start cycle is up to about 60,000 cycles.

117. The method of claim 74 wherein said sufficient number of simulated cold start cycles is from about 35,000 to about 40,000 cycles.

118. The method of claim 106 wherein said sufficient number of simulated cold start cycles is up to about 60,000 cycles.

119. The method of claim 106 wherein said sufficient number of simulated cold start cycles is from about 35,000 to about 40,000 cycles.

120. The method of claim 111 wherein said sufficient number of simulated cold start cycles is up to about 60,000 cycles.

121. The method of claim 111 wherein said sufficient number of simulated cold start cycles is from about 35,000 to about 40,000 cycles.

122. A method for simulating the impact of cold start on a catalytic converter, the method comprising:
providing a non-engine based exhaust component rapid aging system comprising a combustor in fluid communication with an air supplier, a fuel supplier, and a catalytic converter, said combustor comprising a swirl plate comprising a substantially central bore and a combustor tube comprising an inner wall, said swirl plate producing a first feedstream flowpath comprising air directed inward toward said bore and a second feedstream flowpath comprising air directed outward toward said inner wall of said combustor tube, said combustor providing substantially continuous and effective stoichiometric combustion of a fuel feedstream to produce an exhaust product;
subjecting the catalytic converter to a sufficient number of simulated cold start cycles to simulate the effect of cold start aging on said catalytic converter, the simulated cold start cycles comprising:
exposing said catalytic converter at an initial temperature sufficiently low to simulate cold start to a flow of atomized lubricating oil suspended in air at a flow rate for a first flow time effective to simulate the flow of lubricating oil to the catalytic converter upon cold start of an engine;

activating said combustor under conditions effective to simulate rich warm up mode, said activating occurring while continuing said flow of lubricating oil at said flow rate for second flow time;

halting said flow of lubricating oil; and maintaining said conditions effective to simulate rich warn up mode for a period of time effective to prevent excess build-up of unburned oil on the face of the catalyst, thereby producing a cold start aged catalytic converter; and evaluating the efficiency of the cold start aged catalytic converter.

123. The method of claim 122 wherein said initial, temperature is 100° C. or less;

said flow rate of the lubricating oil is from about 10 to about 40 gram/hour;

said first flow time is from about 2 seconds to about 15 seconds;

said second flow time is about 20 seconds or more;

said period of time is about 20 seconds or more; and, the conditions effective to simulate rich warm up mode comprise an air:fuel ratio (AFR) of from about 9:1 to about 14:1.

124. The method of claim 122 wherein said initial temperature is 70° C. or less;

said flow rate of the lubricating oil is from about 28 to about 30 grams/hour; and, said first flow time is about 4 seconds.

125. The method of claim 123 wherein said period of time is about 60 seconds.

126. The method of claim 125 further comprising cooling said catalytic converter to said initial temperature.

127. The method of claim 126 wherein said cooling comprises blowing air onto said catalytic converter at an initial air flow rate of 40 SCFM or more.

128. The method of claim 122 wherein said sufficient number of simulated cold start cycles is up to about 60,000 cycles.

129. The method of claim 123 wherein said sufficient number of simulated cold start cycles is up to about 60,000 cycles.

130. The method of claim 123 wherein said sufficient number of simulated cold start cycles is from about 35,000 to about 40,000 cycles.

131. A method for simulating the impact of cold start on a catalytic converter, the method comprising;

providing a non-engine based exhaust component rapid aging system comprising a combustor in fluid communication with an air supplier a fuel supplier, and a catalytic converter, said combustor producing a pattern of collapsed conical and swirl flow in said combustion tube that defines at least one flowpath along said bore, wherein said bore comprises an inner diameter, and a pattern produced by said flowpath collapses and expands at intervals that are substantially equal to said inner diameter of said burner, said combustor providing substantially continuous and effective stoichiometric combustion of a fuel feedstream to produce an exhaust product;

subjecting the catalytic converter to a sufficient number of simulated void start cycles to simulate the effect of cold start aging on said catalytic converter, the simulated cold start cycles comprising:

exposing said catalytic converter at an initial temperature sufficiently low to simulate cold start to a flow of atomized lubricating oil suspended in air at a flow rate for a first flow time effective to simulate the flow of lubricating oil to the catalytic converter upon cold start of an engine;

activating said combustor under conditions effective to simulate rich warm up mode, said activating occurring while continuing said flow of lubricating oil at said flow rate for second flow time;

halting said flow of lubricating oil; and maintaining said conditions effective to simulate rich warm up mode for a period of time effective to prevent excess build-up of unburned oil on the face of the catalyst, thereby producing a cold start aged catalytic converter; and evaluating the efficiency of the cold start aged catalytic converter.

132. The method of claim 131 wherein said initial temperature is 100° C. or less;

said flow rate of the lubricating oil is from about 10 to about 40 grams/hour;

said first flow time is from about 2 seconds to about 15 seconds;

said second flow time is about 20 seconds or more;

said period of time is about 20 seconds or more; and, the conditions effective to simulate rich warm up mode comprise an air:fuel ratio (AFR) of from about 9:1 to about 14:1.

133. The method of claim 131 wherein said initial temperature is 70° C. or less;

said flow rate of the lubricating oil is from about 28 to about 30 grams/hour; and, said first flow time is about 4 seconds.

134. The method of claim 132 wherein said period of time is about 60 seconds.

135. The method of claim 132 further comprising cooling said catalytic converter to said initial temperature.

136. The method of claim 135 wherein said cooling comprises blowing air onto said catalytic converter at an initial airflow rate of 40 SCFM or more.

137. The method of claim 122 wherein said sufficient number of simulated cold start cycles is up to about 60,000 cycles.

138. The method of claim 123 wherein said sufficient number of simulated cold start cycles is up to about 60,000 cycles.

139. The method of claim 123 wherein said sufficient number of simulated cold start cycles is from about 35,000 to about 40,000 cycles.

* * * * *